(12) United States Patent
Hu

(10) Patent No.: US 11,449,211 B2
(45) Date of Patent: Sep. 20, 2022

(54) SYSTEMS AND METHODS FOR DATA LOADING

(71) Applicant: SHANGHAI UNITED IMAGING HEALTHCARE CO., LTD., Shanghai (CN)

(72) Inventor: Juli Hu, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 108 days.

(21) Appl. No.: 16/137,635

(22) Filed: Sep. 21, 2018

(65) Prior Publication Data

US 2019/0087059 A1 Mar. 21, 2019

(30) Foreign Application Priority Data

Sep. 21, 2017 (CN) .......................... 201710859020.8

(51) Int. Cl.
*G06F 17/00* (2019.01)
*G06F 3/0486* (2013.01)
(Continued)

(52) U.S. Cl.
CPC ........ *G06F 3/0486* (2013.01); *G06F 3/04817* (2013.01); *G06F 3/04886* (2013.01); *H04L 67/75* (2022.05)

(58) Field of Classification Search
CPC ............. G06F 17/2264; G06F 3/04817; G06F 3/0486; G06F 3/04886; H04L 67/36
(Continued)

(56) References Cited

U.S. PATENT DOCUMENTS 8,635,548 B2 * 1/2014 Facemire ................ G06F 40/14
715/769
9,164,673 B2 * 10/2015 Cheng ..................... G06F 3/048
(Continued)

FOREIGN PATENT DOCUMENTS

CN 101764885 A 6/2010
CN 101782927 A 7/2010
(Continued)

OTHER PUBLICATIONS

T. Todd Elvins, 'Engineering a Human Factor-Based Geographic User Interface', IEEE Xplore, Published 1998 (Year: 1998).*
(Continued)

*Primary Examiner* — Stephen S Hong
*Assistant Examiner* — Matthew J Ludwig
(74) *Attorney, Agent, or Firm* — Metis IP LLC

(57) ABSTRACT

The disclosure relates to a method and system for data loading. The method may include obtaining primary data related to an object. The method may also include generating a primary indicator related to the primary data for display in a first region of a user interface. The method may also include receiving a primary user instruction related to a moving operation applied on the primary indicator that moves the primary data from the first region to a second region of the user interface. The method may also include determining a primary data loading command based on the moving operation. The method may also include generating secondary data for display in the second region of the user interface based on the primary data and the primary data loading command.

18 Claims, 25 Drawing Sheets

(51) Int. Cl.
    *G06F 3/04817*     (2022.01)
    *G06F 3/04886*     (2022.01)
    *H04L 67/75*     (2022.01)

(58) Field of Classification Search
    USPC .......................................... 715/243, 246, 253
    See application file for complete search history.

(56) References Cited

U.S. PATENT DOCUMENTS

| | | | | |
|---|---|---|---|---|
| 9,817,542 | B2* | 11/2017 | Laubach | G06F 3/04812 |
| 9,973,612 | B2* | 5/2018 | Son | G06F 3/0486 |
| 10,347,027 | B2* | 7/2019 | Stewart | G06F 3/04883 |
| 10,489,010 | B1* | 11/2019 | Minton | G16H 30/40 |
| 10,585,965 | B2* | 3/2020 | Ochiai | G06F 16/958 |
| 10,921,974 | B2* | 2/2021 | DeMaris | G06F 3/0486 |
| 2004/0001094 | A1* | 1/2004 | Unnewehr | G06F 3/0486 |
| | | | | 715/769 |
| 2007/0189737 | A1* | 8/2007 | Chaudhri | G06F 3/04842 |
| | | | | 386/234 |
| 2007/0250511 | A1* | 10/2007 | Endler | G06F 16/951 |
| 2010/0277429 | A1* | 11/2010 | Day | G09G 5/006 |
| | | | | 345/173 |
| 2012/0092268 | A1 | 4/2012 | Tsai et al. | |
| 2012/0306784 | A1* | 12/2012 | Axelsson | G06F 3/0486 |
| | | | | 345/173 |
| 2013/0212530 | A1 | 8/2013 | Takase et al. | |
| 2013/0321340 | A1* | 12/2013 | Seo | G06F 3/04883 |
| | | | | 345/174 |
| 2014/0258905 | A1 | 9/2014 | Lee et al. | |
| 2014/0351118 | A1* | 11/2014 | Zhao | G06Q 20/326 |
| | | | | 705/40 |
| 2015/0160829 | A1 | 6/2015 | Du | |
| 2015/0169163 | A1* | 6/2015 | Lee | G06F 3/0488 |
| | | | | 715/769 |
| 2015/0254369 | A1* | 9/2015 | Hou | G06F 3/0486 |
| | | | | 707/798 |
| 2016/0055232 | A1* | 2/2016 | Yang | G06F 3/04842 |
| | | | | 707/740 |
| 2016/0224221 | A1* | 8/2016 | Liu | G06F 3/0488 |
| 2016/0274750 | A1 | 9/2016 | Stewart | |
| 2017/0004638 | A1* | 1/2017 | Csenteri | G06T 11/206 |
| 2017/0024106 | A1* | 1/2017 | Wild | G06F 3/04847 |
| 2017/0115944 | A1* | 4/2017 | Oh | G06F 9/451 |
| 2017/0169592 | A1* | 6/2017 | Ruble | G06T 11/60 |
| 2017/0269827 | A1* | 9/2017 | Choi | G06F 3/04845 |
| 2020/0310752 | A1* | 10/2020 | Lee | G06F 3/04817 |

FOREIGN PATENT DOCUMENTS

| | | |
|---|---|---|
| CN | 102415903 A | 4/2012 |
| CN | 102768605 A | 11/2012 |
| CN | 103176687 A | 6/2013 |
| CN | 103425395 A | 12/2013 |
| CN | 106502498 A | 3/2017 |
| CN | 106681599 A | 5/2017 |
| CN | 106951152 A | 7/2017 |

OTHER PUBLICATIONS

The Third Office Action in Chinese Application No. 201710859020.8 dated May 12, 2021, 18 pages.

* cited by examiner

SYSTEMS AND METHODS FOR DATA LOADING

CROSS-REFERENCE TO RELATED APPLICATIONS

This application claims priority of Chinese Application No. 201710859020.8 filed on Sep. 21, 2017, the entire contents of which is hereby incorporated by reference.

TECHNICAL FIELD

This application generally relates to a system and method applied in data handling, and more specifically relates to a system and method for data loading and presentation.

BACKGROUND

When a user wants a terminal to load data according to a specified loading mode, the user may need to press and hold a shortcut key corresponding to the specified loading mode. Alternatively, the user may need to click an icon corresponding to the specified loading mode on a terminal to select the specified loading mode. The user may then drag the data to be loaded into a specified area or otherwise so that the terminal loads the data according to the specified loading mode.

There are many kinds of data loading modes. In order to distinguish these data loading modes, each data loading mode may correspond to a unique icon or shortcut key. The use of a shortcut key to select a corresponding data loading mode may need a user to know the corresponding icon or shortcut key for each data loading mode, which may be inconvenient for the user.

SUMMARY

In a first aspect of the present disclosure, a system for data loading is provided. The system may include at least one storage device and at least one processor. The at least one storage device may include a set of instructions. The at least one processor may be configured to communicate with the at least one storage device. When executing the set of instructions, the system may be configured to perform one or more of the following operations. The system may obtain primary data related to an object. The system may also generate a primary indicator related to the primary data for display in a first region of a user interface. The system may also receive a primary user instruction related to a moving operation applied on the primary indicator that moves the primary data from the first region to a second region of the user interface. The system may also determine a primary data loading command based on the moving operation. The system may also generate secondary data for display in the second region of the user interface based on the primary data and the primary data loading command.

In some embodiments, the system may be further configured to perform one or more of the following operations. In response to the moving operation, the system may generate one or more secondary indicators for display on the user interface. Each secondary indicator of the one or more secondary indicators may correspond to a secondary data loading command of the one or more secondary data loading commands. The system may also receive a secondary user instruction related to a selection of a particular secondary indicator from the one or more secondary indicators. The system may also select a secondary indicator based on the secondary user instruction. The system may also generate the secondary data based on the primary data and a secondary data loading command corresponding to the selected secondary indicator.

In some embodiments, the system may be further configured to perform one or more of the following operations. The system may determine a trajectory of the moving operation on the user interface. The system may also identify a sub-region where the primary data is moved in the second region based on the trajectory. The system may also determine the primary data loading command based on the sub-region of the second region.

In some embodiments, the moving operation may move the primary data from the first region to the second region of the user interface by moving the primary indicator from the first region to the second region.

In some embodiments, at least one of the primary user instruction or the secondary user instruction may be received via a user input device. The user input device may be configured to implement the user interface. The user input device may also be configured to detect a user operation. The user input device may also be configured to generate the moving operation based on the detected user operation.

In some embodiments, the user operation may include at least one operation of a motion of at least a portion of the user on the user interface, a voice input, or a gesture of the user.

In some embodiments, the secondary data may include an image related to an anatomical structure of the object or an imaging protocol related to the object.

In some embodiments, the system may be further configured to perform one or more of the following operations. In response to the moving operation, the system may generate a loading command list in the second region. The loading command list may include the one or more secondary indicators.

In some embodiments, the system may be further configured to perform one or more of the following operations. The system may cause the primary indicator to be displayed adjacent to the secondary indicator.

In a second aspect of the present disclosure, a method for data loading is provided. The method may be implemented on at least one machine, each of which may include at least one processor and a storage device. The method may include one or more of the following operations. The method may include obtaining primary data related to an object. The method may also include generating a primary indicator related to the primary data for display in a first region of a user interface. The method may also include receiving a primary user instruction related to a moving operation applied on the primary indicator that moves the primary data from the first region to a second region of the user interface. The method may also include determining a primary data loading command based on the moving operation. The method may also include generating secondary data for display in the second region of the user interface based on the primary data and the primary data loading command.

In some embodiments, the method may include one or more of the following operations. In response to the moving operation, the method may include generating one or more secondary indicators for display on the user interface. Each secondary indicator of the one or more secondary indicators may correspond to a secondary data loading command of the one or more secondary data loading commands. The method may also include receiving a secondary user instruction related to a selection of a particular secondary indicator from the one or more secondary indicators. The method may also include selecting a secondary indicator based on the secondary user instruction. The method may also include generating the secondary data based on the primary data and a secondary data loading command corresponding to the selected secondary indicator.

In some embodiments, the method may include one or more of the following operations. The method may include determining a trajectory of the moving operation on the user interface. The method may also include identifying a sub-region where the primary data is moved in the second region based on the trajectory. The method may also include determining the primary data loading command based on the sub-region of the second region.

In some embodiments, the moving operation may move the primary data from the first region to the second region of the user interface by moving the primary indicator from the first region to the second region.

In some embodiments, at least one of the primary user instruction or the secondary user instruction may be received via a user input device. The user input device may be configured to implement the user interface. The user input device may also be configured to detect a user operation. The user input device may also be configured to generate the moving operation based on the detected user operation.

In some embodiments, the user operation may include at least one operation of a motion of at least a portion of the user on the user interface, a voice input, or a gesture of the user.

In some embodiments, the primary data may relate to an attribute of the object.

In some embodiments, the secondary data may include an image related to an anatomical structure of the object or an imaging protocol related to the object.

In some embodiments, the method may further include one or more of the following operations. In response to the moving operation, the method may include generating a loading command list in the second region. The loading command list may include the one or more secondary indicators.

In some embodiments, the method may further include causing the primary indicator to be displayed adjacent to the secondary indicator.

In a third aspect of the present disclosure, a non-transitory computer readable medium embodying a computer program product may store instructions, the instructions, when executed by the computer program product, the computer program product may be configured to cause a computing system to perform one or more of the following operations. The computing system may obtain primary data related to an object. The computing system may also generate a primary indicator related to the primary data for display in a first region of a user interface. The computing system may also receive a primary user instruction related to a moving operation applied on the primary indicator that moves the primary data from the first region to a second region of the user interface. The computing system may also determine a primary data loading command based on the moving operation. The computing system may also generate secondary data for display in the second region of the user interface based on the primary data and the primary data loading command.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by other expression if they achieve the same purpose.

Figure 2:
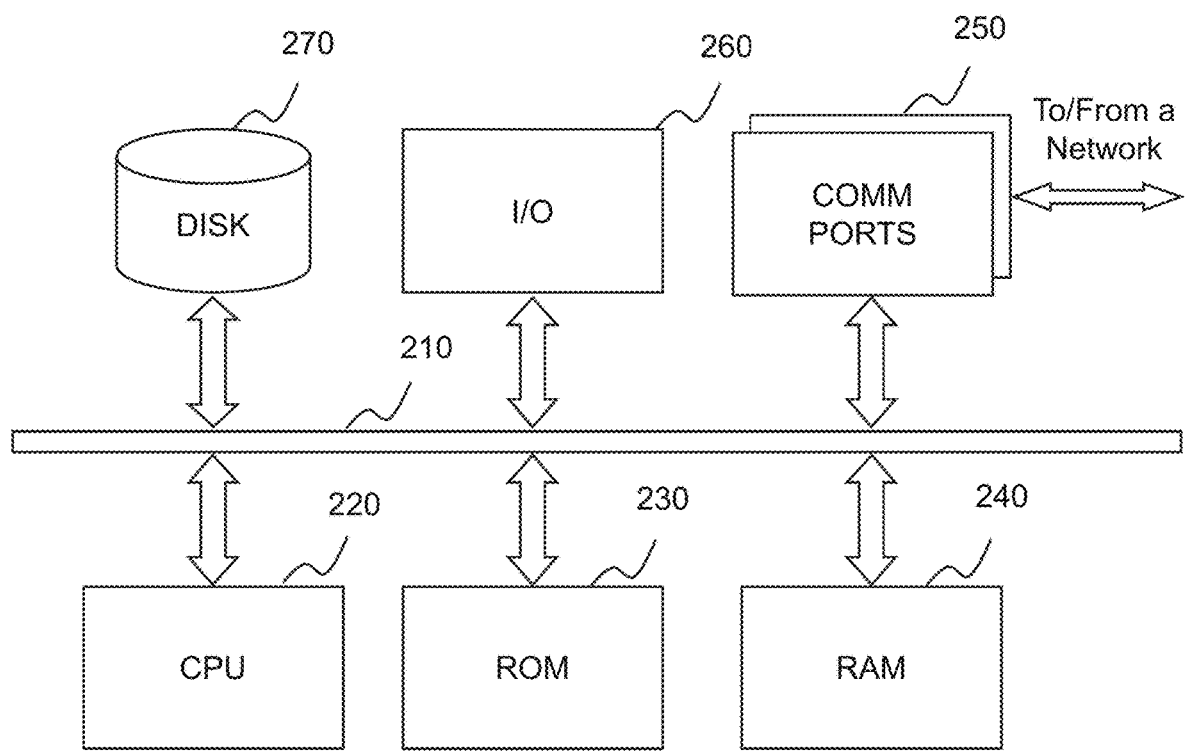
FIG. 2 is a block diagram illustrating exemplary hardware and software components of computing device 200 on which the data system 100 may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., CPU/processor 220 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for data loading for, such as fast data presentation or easy data management purposes. The data system may find its applications in different fields such as medicine or industry. For example, the data system may be used for patient information management, patient information comparison, or the like, or any combination thereof.

Some embodiments of the present disclosure are directed to systems and methods for loading data with different modes. A user may load data in a specific mode by moving an indicator, corresponding to the data, to a specific position. Based on the position the indicator is moved, a primary data loading demand may be generated so that the data may be loaded accordingly. In addition, if the moving of the indicator is paused, one or more secondary indicators may be activated, depending on the pause location, to allow a user selection so that a secondary data loading demand may be generated to further specify the contents and/or mode data are to be loaded. If there are many kinds of data loading modes and each data loading mode corresponds to a shortcut key, the user do not need to use the shortcut key to select the corresponding data loading mode. This greatly simplifies the operation of the user, and increases the efficiency of data loading.

The following description is provided to help better understanding data loading methods and/or systems. The term "data" used in the present disclosure may refer to various kinds of information. Data may include symbols, words, numbers, curves, voice, images, videos, or the like, or any combination thereof. Data may be loaded in a specified data loading mode for display on a user interface. As used herein, the phrase "data loading mode" may include the form or other details in which data are to be loaded and/or displayed. For example, a duplicate data loading mode may generate a duplicate of the data to be loaded and display the duplicate on the user interface. The user interface may allow interaction with each other between a user and the system 100. For instance, a user interface may include a graphical user interface, also called a human-machine interface. This is not intended to limit the scope the present disclosure. For persons having ordinary skills in the art, a certain amount of variations, changes, and/or modifications may be deducted under guidance of the present disclosure. Those variations, changes, and/or modifications do not depart from the scope of the present disclosure.

Figure 1:
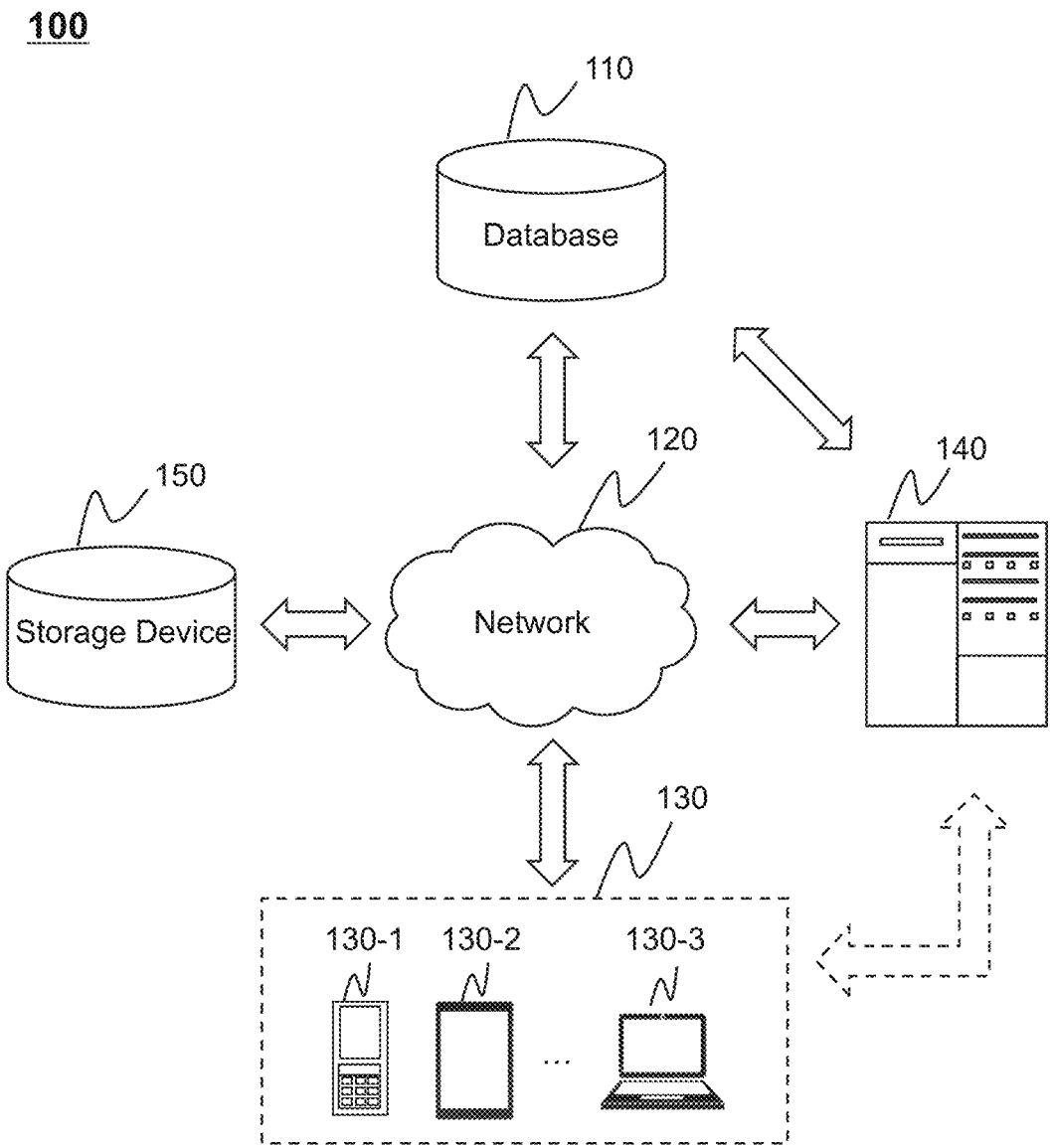
FIG. 1 is a schematic diagram illustrating an exemplary the data system according to some embodiments of the present disclosure.

FIG. 1 is a schematic diagram illustrating an exemplary data system according to some embodiments of the present disclosure. For illustration purposes, as shown in FIG. 1, data system 100 may include database 110, network 120, one or more terminals 130, processing device 140, and storage device 150. The components in the data system 100 may be connected in one or more of various ways. Merely by way of example, database 110 may be connected to processing device 140 through network 120. As another example, database 110 may be connected to processing device 140 directly. As a further example, one or more terminals 130 may be connected to another component of data system 100 (e.g., processing device 140) via network 120 as illustrated in FIG. 1. As still a further example, at least one terminal 130 may be connected to processing device 140 directly as illustrated by the dotted arrow in FIG. 1. As still a further example, storage device 150 may be connected to another component of the data system 100 (e.g., processing device 140) directly as illustrated in FIG. 1, or through network 120.

Database 110 may be an organized data collection stored in a storage device that organizes, stores, and manages data according to a data structure. Database 100 may be local or remote. Exemplary data structures may include a hierarchical data structure model, a mesh data structure model, a relational data structure model, etc. Merely by way of example with reference to a medical database, database 110 may include basic information (e.g., age, gender, height, weight, etc.), a medical history (e.g., whether there is a chronic disease of, such as, heart, liver, lung, kidney, etc.), an allergy history, a current medical condition (e.g., an ongoing situation, symptoms, changes in the symptoms, occurrence of new symptoms, the progression of the current medical condition, etc.), or the like, or any combination thereof. The medical data stored in database 110 may be organized and shareable.

Network 120 may include any suitable network that can facilitate exchange of information and/or data for the data system 100. In some embodiments, one or more components of database 110, terminal(s) 130, processing device 140, storage device 150, etc., may communicate information and/or data with one or more other components of data system 100 via network 120. For example, processing device 140 may obtain data from database 110 via the network 120. As another example, processing device 140 may obtain user instructions from terminal(s) 130 via network 120. Network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, network 120 may include one or more network access points. For example, network 120 may include wired and/or wireless network access points such as base stations and/or internet exchange points through which one or more components of the data system 100 may be connected to network 120 to exchange data and/or information.

Terminal(s) 130 may include mobile apparatus 130-1, tablet computer 130-2, laptop computer 130-3, or the like, or any combination thereof. In some embodiments, mobile apparatus 130-1 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, terminal(s) 130 may be part of processing device 140.

Processing device 140 may process data and/or information obtained from database 110, terminal(s) 130, and/or the storage device 150. In some embodiments, processing device 140 may be a computer, a user console, a single server or a server group, etc. The server group may be centralized or distributed. In some embodiments, processing device 140 may be local or remote. For example, processing device 140 may access information and/or data stored in database 110, terminal(s) 130, and/or storage device 150 via network 120. As another example, processing device 140 may be directly connected to database 110, terminal(s) 130 and/or storage device 150 to access stored information and/or data. In some embodiments, processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, processing device 140 may be implemented on a computing device 200 having one or more components as illustrated in FIG. 2.

Storage device 150 may store data, instructions, and/or any other information. In some embodiments, storage device 150 may store data obtained from the terminal(s) 130 and/or processing device 140. In some embodiments, storage device 150 may store data and/or instructions that processing device 140 may execute or use to perform exemplary methods described in the present disclosure. In some embodiments, storage device 150 may include mass storage, removable storage, volatile read-and-write memory, read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, storage device 150 may be connected to network 120 to communicate with one or more other components in the data system 100 (e.g., processing device 140, terminal(s) 130, etc.). One or more components in the data system 100 may access the data or instructions stored in storage device 150 via network 120. In some embodiments, storage device 150 may be directly connected to or communicate with one or more other components in the data system 100 (e.g., processing device 140, terminal(s) 130, etc.). In some embodiments, storage device 150 may be part of processing device 140.

It should be noted that the above description of the data system 100 is merely provided for the purposes of illustration, and not intended to limit the scope of the present disclosure. For persons having ordinary skills in the art, multiple variations and modifications may be made under the teachings of the present disclosure. For example, the assembly and/or function of the data system 100 may be varied or changed according to specific implementation scenarios. In some embodiments, some other components may be added into the data system 100. However, those variations and modifications also fall within the scope of the present disclosure.

FIG. 2 is a block diagram illustrating exemplary hardware and software components of computing device 200 on which the data system 100 may be implemented according to some embodiments of the present disclosure.

Computing device 200 may be a general purpose computer or a special purpose computer. Both may be used to implement a data system of the present disclosure. Computing device 200 may be used to implement any component of the service as described herein. For example, processing device 140 of the data system 100 may be implemented on computing device 200, via its hardware, software program, firmware, or a combination thereof. Although only one such computer is shown for convenience, the computer functions related to the data system 100 as described herein may be implemented in a distributed manner on a number of similar platforms to distribute the processing load.

Computing device 200, for example, may include communication (COMM) ports 250 connected to and from a network (e.g., network 120) connected thereto to facilitate data communications. Computing device 200 may also include central processing unit (CPU) 220, in the form of one or more processors, for executing program instructions. The exemplary computer platform may include internal communication bus 210, program storage and data storage of different forms, for example, disk 270, and read only memory (ROM) 230, or random access memory (RAM) 240, for various data files to be processed and/or transmitted by the computer. The exemplary computer platform may also include program instructions stored in ROM 230, RAM 240, and/or other type of non-transitory storage medium to be executed by CPU 220. The methods and/or processes of the present disclosure may be implemented as the program instructions. Computing device 200 also includes I/O 260, supporting input/output between the computer and other components therein. Computing device 200 may also receive programming and data via network communications.

Merely for illustration, only one CPU and/or processor is described in computing device 200. However, it should be noted that computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, the CPU and/or processor of computing device 200 executes both step A and step B. As in another example, step A and step B may also be performed by two different CPUs and/or processors jointly or separately in computing device 200 (e.g., the first processor executes step A, and the second processor executes step B; or the first and second processors jointly execute steps A and B).

Figure 3:
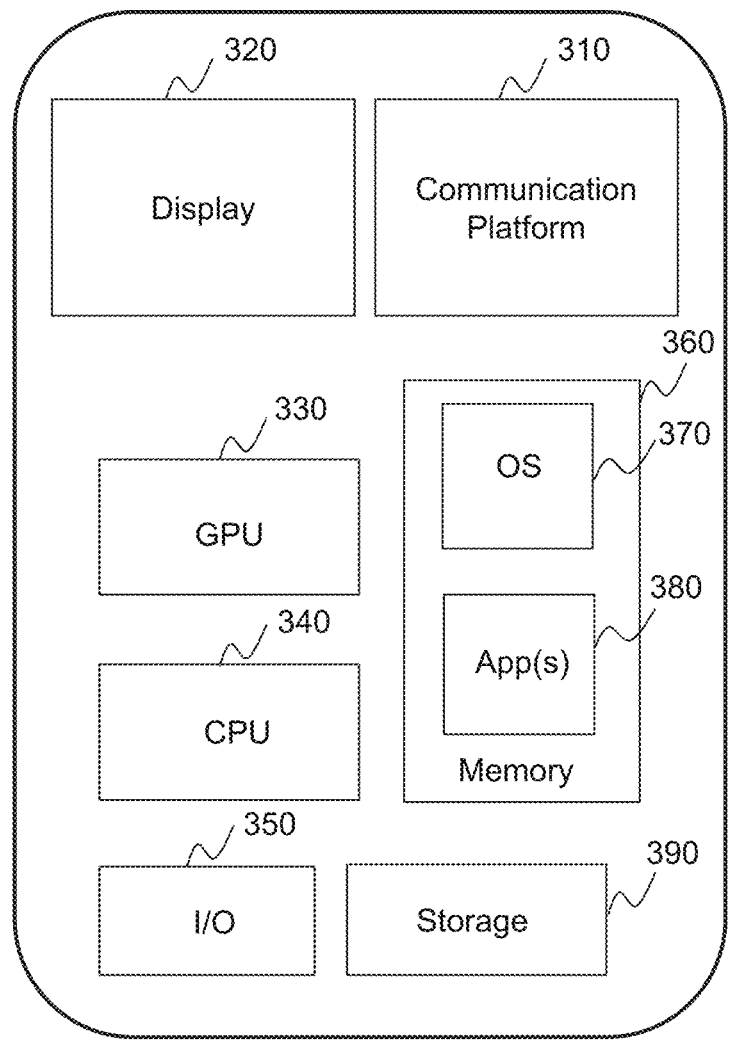
FIG. 3 is a schematic diagram illustrating exemplary hardware and/or software components of an exemplary mobile device on which terminal(s) 130 may be implemented according to some embodiments of the present disclosure.

FIG. 3 is a schematic diagram illustrating exemplary hardware and/or software components of an exemplary mobile device on which terminal(s) 130 may be implemented according to some embodiments of the present disclosure. As illustrated in FIG. 3, mobile device 300 may include communication platform 310, display 320, graphic processing unit (GPU) 330, central processing unit (CPU) 340, I/O 350, memory 360, and storage 390. In some embodiments, any other suitable component, including but not limited to a system bus or a controller (not shown), may also be included in mobile device 300. In some embodiments, mobile operating system 370 (e.g., iOS™, Android™, Windows Phone™) and one or more applications 380 may be loaded into memory 360 from storage 390 in order to be executed by CPU 340. Applications 380 may include a browser or any other suitable mobile apps for receiving and rendering information relating to image processing or other information from processing device 140. User interactions with the information stream may be achieved via I/O 350 and provided to processing device 140 and/or other components of the data system 100 via network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
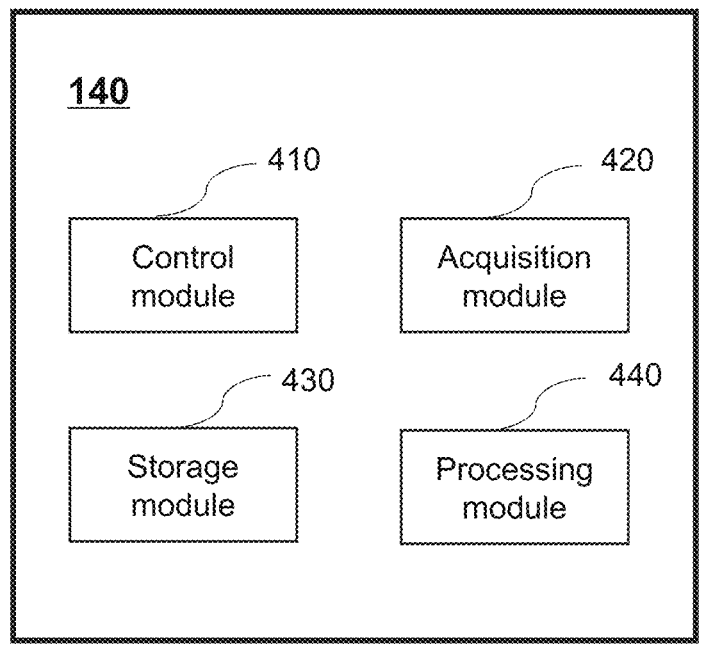
FIG. 4 is a block diagram illustrating an exemplary processing device according to some embodiments of the present disclosure.

FIG. 4 is a block diagram illustrating an exemplary processing device according to some embodiments of the present disclosure. Processing device 140 may include control module 410, acquisition module 420, storage module 430, and processing module 440. Processing device 140 may be implemented on various components (e.g., computing device 200 as illustrated in FIG. 2, mobile device 300 as illustrated in FIG. 3).

Control module 410 may generate a control parameter for controlling acquisition module 420, storage module 430, and/or processing module 440. For example, control module 410 may control acquisition module 420 as to whether to acquire data related to an object, when data acquisition may occur, etc. As another example, control module 410 may control processing module 440 to generate an indicator corresponding to the data acquired by acquisition module 420. In some embodiments, control module 410 may receive a real-time or a predetermined command provided by a user (e.g., a doctor) and cause an adjustment of acquisition module 420, and/or cause processing module 440 to load data of an object according to the received command. In some embodiments, control module 410 may communicate with other modules in the data system 100 for exchanging information or data.

Acquisition module 420 may acquire or receive information/data from, e.g., an imaging device (e.g., a computing tomography apparatus, a magnetic resonance imaging apparatus, a positron emission tomography apparatus, not shown in FIG. 1), a treatment device (e.g., a radiotherapy apparatus, not shown in FIG. 1), an external storage device (e.g., a cloud server, a universal serial bus drive, a compact disc, a portable hard drive, not shown in FIG. 1), database 110, processing module 440, etc. In some embodiments, acquisition module 420 may acquire primary data related to an object. The primary data may relate to an attribute of the object. The primary data may include analog data and/or digital data corresponding to various information in the form of, such as, text, a curve, an image, a video, an audio, etc. Merely by way of example with reference to a patient's medical data, acquisition module 420 may acquire or receive basic information (e.g., age, gender, height, weight, etc.), a medical history (e.g., whether there is a chronic disease of, such as, the heart, the liver, a lung, the kidney, etc.), the allergy history, a current medical condition (e.g., the onset of the current medical condition, symptoms, changes in the symptoms, the appearance of new symptoms, the progression of the current medical condition, etc.), or the like, or any combination thereof.

Storage module 430 may store information. The information may include data from acquisition module 410, operation instructions of a user obtained via, e.g., communication ports 250, results generated by processing module 440, etc. Storage module 430 may store information in the form of text, a curve, a digital document, sound, an image, a video, etc. In some embodiments, storage module 430 may be a storage device of one of various types such as a solid-state hard disk, a mechanical hard disk, a universal serial bus (USB) flash memory, a secure digital (SD) memory card, an optical disk, a random-access memory (RAM), a read-only memory (ROM), etc. In some embodiments, storage module 430 may be one or more mass storage devices, for example, a mass storage array managed by one or more controllers. In some embodiments, storage module 430 may be a local storage device of processing device 140, an external storage device, a distributed storage device (e.g., cloud storage, etc.) that is operably connected to data system 100 via, e.g., network 120, etc.

Processing module 440 may process information/data provided by various modules in the data system 100. Processing module 440 may process data acquired by acquisition module 410 or retrieved from storage module 430, etc. In some embodiments, processing module 440 may determine an indicator corresponding to the data acquired by acquisition module 420. In some embodiments, processing module 440 may select a data loading mode for loading the primary data acquired by acquisition module 420. In some embodiments, processing module 440 may be one or more processing components or devices, such as a central processing unit (CPU), a graphics processing unit (GPU), a digital signal processor (DSP), a system on a chip (SoC), a microcontroller unit (MCU), etc. In some embodiments, processing module 440 may also be a specially designed processing component or device with special functions.

It should be noted that the above descriptions of processing device 140 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, processing device 140 may include one or more other modules. However, those variations and modifications also fall within the scope of the present disclosure.

Figure 5:
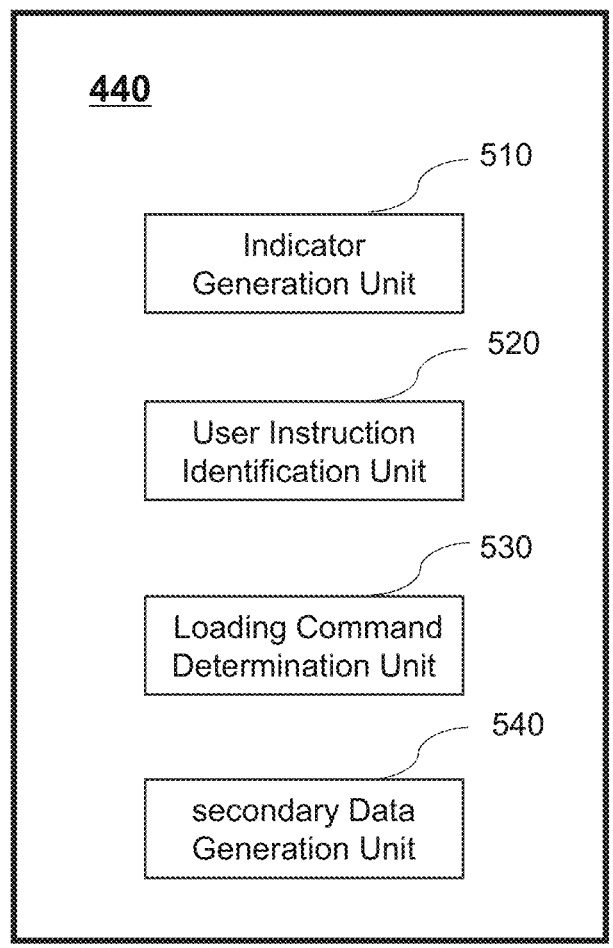
FIG. 5 is a block diagram illustrating an exemplary processing module according to some embodiments of the present disclosure.

FIG. 5 is a block diagram illustrating an exemplary processing module according to some embodiments of the present disclosure. Processing module 440 may include indicator generation unit 510, user instruction identification unit 520, loading command determination unit 530, and secondary data generation unit 540. Exemplary implementations of the units may be found elsewhere in the present disclosure.

Indicator generation unit 510 may generate an indicator. In some embodiments, indicator generation unit 510 may generate a primary indicator corresponding to the primary data. For example, the primary indicator may be an icon indicating the format or content of the primary data. Exemplary icons of the primary data may include a folder icon, an image icon, a text icon, etc. In some embodiments, the primary indicator may be displayed in a first region of a user interface. The first region of the user interface may be an area on the user interface listing data available to be loaded. In some embodiments, indicator generation unit 510 may generate a plurality of primary indicators corresponding to different primary data. For instance, indicator generation unit 510 may generate a primary indicator A corresponding to primary data of an object A, and generate a primary indicator B corresponding to primary data of an object B.

In some embodiments, indicator generation unit 510 may generate one or more secondary indicators. The primary data may be selected and moved from a first region to a second region. For example, a user may select the primary data by putting a cursor on the primary indicator corresponding to the primary data, and moving the primary data from the first region to the second region by dragging the primary data via clicking and dragging the cursor. In some embodiments, the primary indicator corresponding to the primary data may follow or not follow the cursor during dragging the primary data. In response to a user operation that moves the primary data or the primary indicator from the first region to the second region of the user interface, indicator generation unit 510 may generate one or more secondary indicators in the second region on the user interface. The second region of the user interface may be an area on the interface where the loaded data are presented in a specific form. In some embodiments, the one or more secondary indicators may be displayed adjacent to the primary indicator or the primary data moved in the second region. In some embodiments, the one or more secondary indicators may be displayed adjacent to the cursor when the primary indicator or the primary data is moved into the second region by the cursor. The one or more secondary indicators may be one or more icons indicating a data loading mode of each of one or more secondary data loading commands. Exemplary icons of the one or more secondary data loading commands may include a circular icon, a square icon, etc. The first region and the second region on the user interface may correspond to different sections of the user interface. The first region and the second region may be indicated by, e.g., a border between the two, by a boundary for each of the two, or the like, or a combination thereof. In some embodiments, there is no border between or boundary/boundaries for the first region and the second region.

In some embodiments, the primary indicator may facilitate the selection of primary data of an object. In some embodiments, the secondary indicator may facilitate the selection of one or more secondary data loading commands. In some embodiments, a secondary data loading command may direct the mode in which the primary data is to be displayed in the second region on the user interface.

In some embodiments, an icon may be associated with a description of a corresponding data loading mode or a corresponding secondary data loading command. For instance, such a description may be shown when a corresponding icon is activated by the user. Merely by way of example, when the user puts a cursor on an icon on the user interface, the corresponding description may be shown on the user interface. In some embodiments, descriptions of different levels of details of a corresponding data loading mode or a corresponding secondary data loading comment may be available to be presented to the user in response to different operations by the user. Merely by way of example, when the user puts a cursor on an icon on the user interface, a corresponding brief description may be shown on the user interface. If the user moves the cursor to or clicks on a question mark shown with the brief description, a more detailed description of the corresponding data loading mode or the corresponding secondary data loading comment may be presented to the user.

User instruction identification unit 520 may identify a user instruction based on the user operation performed on the primary indicator. In some embodiments, the data system 100 may further include a user input device. The user input device may implement the user interface and detect a user operation. A user operation may be performed using a portion of the user (e.g., a finger, a portion of a palm, etc.) with or without the assistance of an external device (e.g., a mouse, a stylus, etc.). For instance, a user operation may include a touch performed by the user (e.g., dragging, sliding, etc.), a gesture performed by the user, or a voice input by the user. Exemplary detection techniques may include pressure sensing, resistance detection, capacitance detection, voice recognition, motion detection, image analysis (e.g., by analyzing one or more images capturing user gesture(s)), or the like, or any combination thereof. The user input device may then determine a moving operation based on the detected user operation. The moving operation may include a sliding operation, a drag operation, etc. In some embodiments, a user operation with respect to the primary data or the primary indicator corresponding to the primary data (e.g., dragging or otherwise moving the primary indicator to a location) or a corresponding moving operation may be displayed on the user interface. In some embodiments, the display may be real-time or substantially real-time so that the user can view the moving operation while performing the user operation.

Further, user instruction identification unit 520 identify a user instruction based on a trajectory of the moving operation. The trajectory may include an initial position of the primary data or the primary indicator corresponding to the primary data, and/or an end position of the primary data or the primary indicator corresponding to the primary data, on the user interface corresponding to the user operation, a path that the moving operation traverses, or the like, or a combination thereof. The initial position of the primary data or the primary indicator corresponding to the primary data may be where the primary indicator is in the first region before the user performs the user operation corresponding to the moving operation. The end position of the primary data or the primary indicator corresponding to the primary data may be where the primary indicator is in the second region after the user performs the user operation corresponding to the moving operation. In some embodiments, if the primary data or the primary indicator corresponding to the primary data is moved by dragging via the cursor and the primary indicator does not follow the cursor during the dragging process, the end position of the primary data may be where the cursor is in the second region after the user performs the user operation corresponding to the moving operation. In some embodiments, the trajectory may further include a pause position where the primary data or the primary indicator corresponding to the primary data pauses on the user interface. The pause position of the primary indicator may be a position on the trajectory between the initial position of the primary data or the primary indicator corresponding to the primary data and the end position of the primary data or the primary indicator corresponding to the primary data where the user pauses in the middle of the user operation for a period longer than a threshold (e.g., a fraction of a second, a second, a couple of seconds, or longer). As used herein, "in the middle of the user operation" does not necessarily mean at exactly the midpoint of the duration of the user operation. In some embodiments, a pause position of the primary data or the primary indicator corresponding to the primary data may be in the second region of the user interface. In some embodiments, the pause position and the end position of the primary data or the primary indicator corresponding to the primary data may be the same. In some embodiments, the pause position and the end position of the primary data or the primary indicator corresponding to the primary data may be different. In some embodiments, the trajectory may not include the pause position.

In some embodiments, user instruction identification unit 520 may identify a primary user instruction based on the end position of the primary indicator in the second region on the user interface. In some embodiments, user instruction identification unit 520 may identify a secondary user instruction based on the pause position of the primary indicator in the second region on the user interface.

Loading command determination unit 530 may determine a data loading command. In some embodiments, there are one or more sub-regions in the second region on the user interface. Loading command determination unit 530 may determine a primary data loading command based on the end position of the primary indicator. The one or more sub-regions in the second region on the user interface may be associated with different data loading commands, such as duplication, comparison, etc. When user instruction identification unit 520 determines that the end position of the primary indicator is in an area of a sub-region in the second region, a primary data loading command corresponding to the sub-region may be determined. The primary data loading command may direct the mode in which the primary data is to be displayed in the second region on the user interface. For example, the primary data loading command may direct the primary data to be displayed in the second region on the user interface in the form of text. As another example, the primary data loading command may direct the primary data to be displayed in the second region on the user interface in the form of an image. The sub-regions in the second region on the user interface may correspond to different sections of the user interface. Different sub-regions may be indicated by, e.g., a border between them, by a boundary for each of them, or the like, or a combination thereof. In some embodiments, there is no border between or boundary/boundaries for the sub-regions.

In some embodiments, the primary data loading command may include one or more modes in which the primary data is to be displayed in the second region on the user interface. The primary data loading command may include one or more modes of data loading corresponding to one or more secondary data loading commands. A secondary data loading command may direct one of the one or more modes included in the primary data loading command in which the primary data is to be displayed in the second region on the user interface.

Loading command determination unit 530 may determine the secondary data loading command based on the moving operation. When user instruction identification unit 520 determines that the pause position of the primary data or the primary indicator corresponding to the primary data is in an area of a sub-region in the second region, indicator generation unit 510 may generate one or more secondary indicators in the sub-region of the second region. In some embodiments, the one or more secondary indicators may be displayed adjacent to the primary indicator or the primary data moved in the second region. In some embodiments, the one or more secondary indicators may be displayed adjacent to the cursor when the primary indicator or the primary data is moved into the second region by the cursor. A secondary indicator may be an icon indicating a secondary data loading command. By resuming the moving of the primary indicator from a pause position in the second region, when user instruction identification unit 520 determines that an end position of the primary data or the primary indicator corresponding to the primary data is in an area of a secondary indicator, a secondary data loading command corresponding to the secondary indicator may be activated.

Secondary data generation unit 540 may generate secondary data for display on the user interface, e.g., in the second region of the user interface. In some embodiments, the secondary data may include analog data and/or digital data related to the primary data. In some embodiments, the secondary data may include an image related to an anatomical structure of the object or an imaging protocol related to the object. The image may include a computed tomography (CT) image, a magnetic resonance (MR) image, or a positron emission computed tomography (PET) image, etc.

In some embodiments, the primary data and the secondary data may both relate to an object. Data relating to an object may include basic information of the object (e.g., age, gender, a photo of the object, height, weight, etc.), a medical history of the object (e.g., whether there is a chronic disease of, such as, the heart, the liver, a lung, the kidney, etc.), an allergy history (e.g., food allergy, medicine allergy, etc.) of the object, a current medical condition of the object (e.g., the onset of the current medical condition, symptoms, changes in the symptoms, the appearance of new symptoms, the progression of the current medical condition, etc.), an image related to an anatomical structure of the object or an imaging protocol related to the object. The image may include a computed tomography (CT) image, a magnetic resonance (MR) image, or a positron emission computed tomography (PET) image, etc. The primary data may include the basic information of the object, e.g., identification information of the object. The secondary data may include information related to a medical history or medical condition of the object. For instance, the secondary data may include a medical history of the object, an allergy history of the object, a current medical condition of the object, an image related to an anatomical structure of the object or the corresponding imaging protocol. As used herein, data or information may include or be presented in the form of text, numbers, an image, a curve, a video, sound, or the like, or a combination thereof. For brevity, the reference to the primary/secondary data herein may indicate the entire dataset or a portion thereof. For instance, the retrieval of the primary/secondary data may mean retrieving the entire dataset or a portion thereof.

In some embodiments, the secondary data of an object may be retrieved or generated based on the primary data of a same object. For instance, when the primary data (or a portion thereof) of an object are displayed according to a primary data loading command or a secondary data loading command, secondary data of the object may be retrieved or generated according to the primary data loading command or the secondary data loading command. In some embodiments, the secondary data may be part of the primary data or generated based on the primary data. For instance, the primary data of an object include identification information of the object and imaging data of one or more of various types (e.g., CT imaging data, MRI imaging data, PET imaging data, etc.) of the object. When a portion of the primary data of the object are displayed according to the primary data loading command and/or the secondary data loading command, certain image data may be retrieved and processed to generate secondary data including an image of the object according to the primary data loading command and/or the secondary data loading command to be displayed on the user interface. In some embodiments, the second data, although not part of the primary data, may be associated with a same object by way of, e.g., an index relating to the identity of an object. For instance, the primary data (or a portion thereof) of an object may be retrieved based on the identity of an object, a primary data loading command, and/or a second loading command, and certain image data of the object may be retrieved from the secondary data, with or without processing, to be displayed on the user interface. In some embodiments, the secondary data may be data or information generated, based on the primary data (or a portion thereof), a primary data loading command, and/or a secondary data loading command, to be displayed.

In some embodiments, secondary data generation unit 540 may generate the secondary data for display based on the primary data and the primary data loading command. For example, with reference to a patient, when the primary data loading command directs to generate a duplicate of the primary data (e.g., basic information of the patient, etc.) for display in the form of text in the second region on the user interface, secondary data generation unit 540 may generate the secondary data for display in the second region of the user interface according to the primary data loading command. In this situation, the secondary data may be a duplicate of the primary data (e.g., basic information of the patient, etc.) displayed in the form of text.

In some embodiments, secondary data generation unit 540 may generate the secondary data for display in the second region based on the primary data and the secondary data loading command. The secondary data may be generated from the primary data and displayed in the second region of the user interface in a mode specified by the secondary data loading command. For example, with reference to a patient, when the secondary data loading command directs to present a CT image corresponding to certain primary data (e.g., treatment information of the patient, etc.) for display in the form of an image in the second region on the user interface, secondary data generation unit 540 may generate the secondary data for display in the second region of the user interface according to the secondary data loading command. In this situation, the secondary data may be a CT image corresponding to the primary data (e.g., treatment information of the patient, etc.) displayed in the form of an image.

It should be noted that the above descriptions of processing module 440 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, processing module 440 may include one or more other units. However, those variations and modifications also fall within the scope of the present disclosure.

Figure 6:
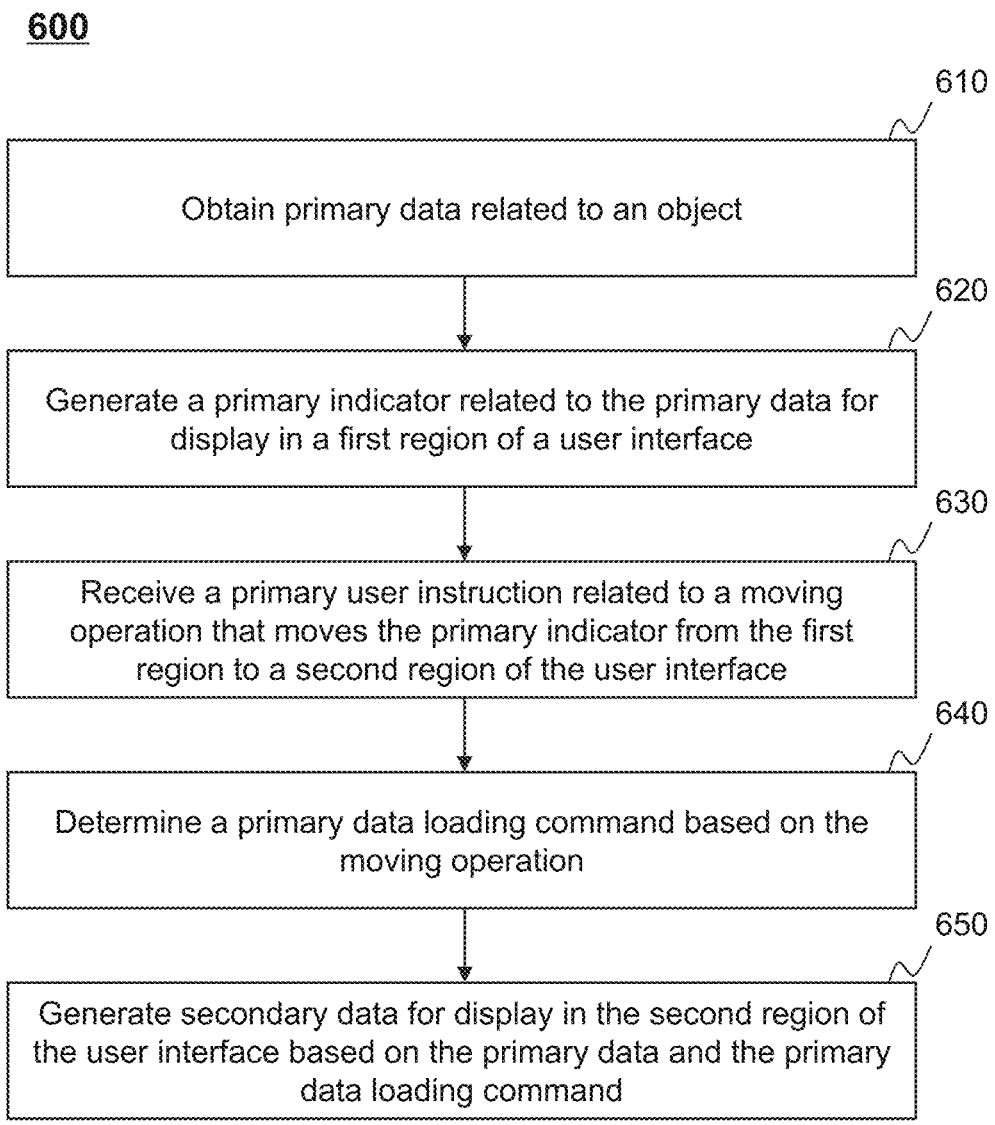
FIG. 6 is a flowchart illustrating an exemplary process for data loading according to some embodiments of the present disclosure.

FIG. 6 is a flowchart illustrating an exemplary process for data loading according to some embodiments of the present disclosure. Process 600 may be stored in a storage device (e.g., storage device 150, storage 390) in the form of instructions (e.g., an application), and invoked and/or executed by processing device 140 (e.g., CPU 220 illustrated in FIG. 2, CPU 340 illustrated in FIG. 3, or one or more modules in processing device 140 illustrated in FIG. 4). The operations of the illustrated process presented below are intended to be illustrative. In some embodiments, process 600 may be accomplished with one or more additional operations not described, and/or without one or more of the operations discussed. Additionally, the order in which the operations of the process 600 as illustrated in FIG. 6 and described below is not intended to be limiting.

In 610, primary data related to an object may be obtained. In some embodiments, acquisition module 420 may obtain the primary data related to the object. The primary data may include data corresponding to various information in any form such as text, a curve, an image, video, audio, etc. Merely by way of example, when the object is a patient, the primary data related to the patient may include basic information (e.g., age, gender, height, weight, etc.), a medical history (e.g., whether there is a chronic disease of, such as, the heart, the liver, a lung, the kidney, etc.), an allergy history, a current medical condition (e.g., the onset of the current medical condition, symptoms, changes in the symptoms, the appearance of new symptoms, the progression of the current medical condition, etc.), or the like, or any combination thereof. In some embodiments, the primary data related to the object may be stored in storage device 150. In some embodiments, the primary data related to the object may be retrieved from database 110.

Figure 9:
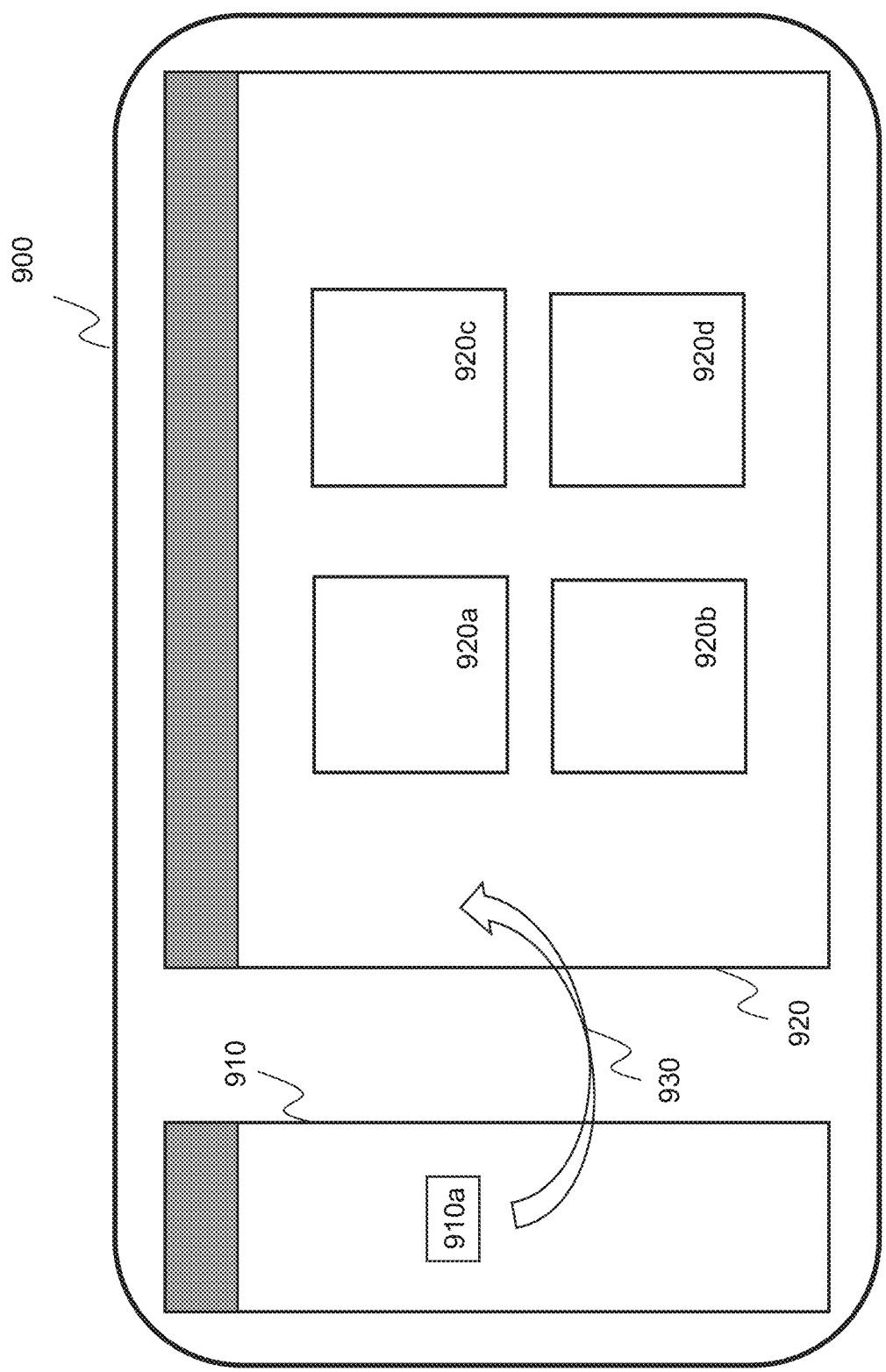
FIGS. 9-11 are schematic diagrams illustrating an exemplary process for data loading according to some embodiments of the present disclosure.

In 620, a primary indicator related to the primary data for display in a first region of a user interface may be generated. In some embodiments, processing module 440 (e.g., indicator generation unit 510) may generate the primary indicator related to the primary data for display in the first region of the user interface. In some embodiments, the primary indicator may be an icon indicating the format or content of the primary data or a portion thereof. Exemplary icons of the primary data may include a folder icon, an image icon, etc. In some embodiments, the first region of the user interface may be on the left side of the user interface. For instance, as illustrated in FIG. 9, user interface 900 may include first region 910 displaying on the left of user interface 900. Box 910a may be the primary indicator related to the primary data for display in first region 910 of user interface 900.

In 630, a primary user instruction related to a moving operation applied on the primary indicator that moves the primary data or the primary indicator corresponding to the primary data from the first region to a second region of the user interface may be received. The primary user instruction may be implemented by moving the primary data or the primary indicator corresponding to the primary data from the first region to the second region of the user interface. In some embodiments, processing module 440 (e.g., user instruction identification unit 520) may detect the moving operation that moves the primary data or the primary indicator corresponding to the primary data from the first region to the second region of the user interface, and may obtain the primary user instruction based on the detected moving operation.

For example, processing module 440 (e.g., user instruction identification unit 520) may identify a trajectory of the moving instruction. The moving instruction may include an initial position of the primary data or the primary indicator corresponding to the primary data, a pause position where the primary data or the primary indicator corresponding to the primary data pauses on the user interface, and/or an end position of the primary data or the primary indicator corresponding to the primary data on the user interface corresponding to the moving operation. The initial position of the primary data or the primary indicator corresponding to the primary data may be where the primary indicator is in the first region before the user performs the moving operation corresponding to the moving operation. The end position of the primary data or the primary indicator corresponding to the primary data may be a position where the primary indicator is in the second region after the user performs the moving operation. In some embodiments, if the primary data or the primary indicator corresponding to the primary data is moved by dragging via the cursor and the primary indicator does not follow the cursor during the dragging process, the end position of the primary data may be where the cursor is in the second region after the user performs the user operation corresponding to the moving operation. A pause position of the primary data or the primary indicator corresponding to the primary data may be a position on the trajectory between the initial position of the primary data or the primary indicator corresponding to the primary data and the end position of the primary data or the primary indicator corresponding to the primary data where the user pauses in the middle of the user operation for a period longer than a threshold (e.g., a fraction of a second, a second, a couple of seconds, or longer). As used herein, "in the middle of the user operation" does not necessarily mean at exactly the midpoint of the duration of the user operation. In some embodiments, the pause position of the primary data or the primary indicator corresponding to the primary data may be in the second region of the user interface. In some embodiments, the end position of the primary data or the primary indicator corresponding to the primary data and the pause position of the primary data or the primary indicator corresponding to the primary data may be the same. In some embodiments, the pause position and the end position of the primary data or the primary indicator corresponding to the primary data may be different. In some embodiments, the trajectory may not include the pause position.

In some embodiments, the moving operation may be generated based on a user operation. The user operation may be performed using a portion of the user (e.g., a finger, a portion of a palm, etc.) with or without the assistance of an external device (e.g., a mouse, a stylus, etc.). For instance, a user operation may include a touch performed by the user (e.g., dragging, sliding, etc.), a gesture performed by the user, or a voice input by the user. The moving operation may include a sliding operation, a drag operation, etc. The user input device may then determine a moving operation based on the detected user operation. In some embodiments, a user operation with respect to the primary indicator (e.g., dragging or otherwise moving the primary indicator to a location) or a corresponding moving operation may be illustrated on the user interface. In some embodiments, the illustration may be real-time or substantially real-time so that the user can view the moving operation while performing the user operation.

In 640, a primary data loading command based on the moving operation may be determined. The primary data loading command may direct the mode in which the primary data are displayed in the second region on the user interface. For example, the primary data loading command may direct the primary data to be displayed in the second region on the user interface in the form of text. As another example, the primary data loading command may direct the primary data to be displayed in the second region on the user interface in the form of an image. As still another example, the primary data loading command may direct the primary data to generate a duplicate of the primary data to be displayed in the second region on the user interface. The primary data loading command may also direct the primary data to be displayed in the second region on the user interface to compare with other data.

In some embodiments, processing module 440 (e.g., loading command determination unit 530) may determine the primary data loading command based on the moving operation. In some embodiments, the second region of the user interface may include one or more sub-regions. The one or more sub-regions in the second region on the user interface may be associated with different data loading commands, such as duplication, comparison, etc. Processing module 440 (e.g., loading command determination unit 530) may determine the primary data loading command based on a sub-region where the end position of the primary indicator is in the second region. Related descriptions may be found elsewhere in the present disclosure. See, e.g., FIG. 7 and descriptions thereof.

In 650, secondary data for display in the second region of the user interface may be generated based on the primary data and the primary data loading command. The secondary data may be generated from the primary data and displayed in the second region of the user interface in a mode according to the primary data loading command. In some embodiments, processing module 440 (e.g., secondary data generation unit 540) may generate the secondary data to be displayed in the second region of the user interface based on the primary data and the primary data loading command. For example, with reference to a patient, when the primary data loading command directs to generate a duplicate of the primary data (e.g., basic information of the patient, etc.) for display in the form of text in the second region on the user interface, processing module 440 (e.g., secondary data generation unit 540) may generate the secondary data for display in the second region of the user interface according to the primary data loading command. In this situation, the secondary data may be a duplicate of the primary data (e.g., basic information of the patient, etc.) displayed in the form of text. Related descriptions may be found elsewhere in the present disclosure.

It should be noted that the above descriptions of process 600 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, process 600 may include one or more other operations. However, those variations and modifications also fall within the scope of the present disclosure.

Figure 7:
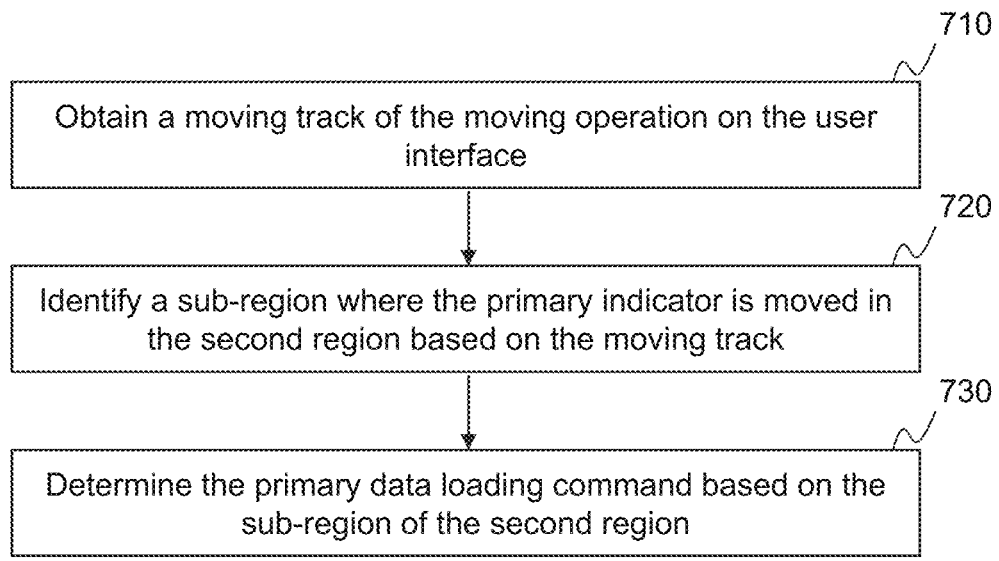
FIG. 7 is a flowchart illustrating an exemplary process for determining a primary data loading command according to some embodiments of the present disclosure.

FIG. 7 is a flowchart illustrating an exemplary process for determining a primary data loading command according to some embodiments of the present disclosure. Process 700, or a portion thereof, may be implemented on processing device 140 (e.g., CPU 220 illustrated in FIG. 2, CPU 340 illustrated in FIG. 3, or one or more modules in processing device 140 illustrated in FIG. 4). The operations of the illustrated process presented below are intended to be illustrative.

In 710, the trajectory of a moving operation on a user interface may be obtained. The trajectory may indicate a position change of the primary data or the primary indicator corresponding to the primary data corresponding to a moving operation on the user interface. In some embodiments, processing module 440 (e.g., user instruction identification unit 520) may obtain the trajectory of the moving operation on the user interface based on coordinates of the primary data or the primary indicator corresponding to the primary data on the user interface. In some embodiments, the moving operation may be generated based on a user operation. The user operation may be performed by a portion of the user with or without the assistance of an external device (e.g., a mouse, a stylus, etc.). For instance, a user operation may include a touch performed by the user (e.g., dragging, sliding, or the like, or any combination thereof), a gesture performed by the user, or a voice input by the user. The moving operation may include a sliding operation, a drag operation, etc.

In 720, a sub-region into which the primary data or the primary indicator corresponding to the primary data is moved in the second region may be identified based on the trajectory. In some embodiments, the second region may include one or more sub-regions. The one or more sub-regions may correspond to different data loading commands, such as duplication, comparison, loading data in the form of text, loading data in the form of an image, etc. In some embodiments, processing module 440 (e.g., user instruction identification unit 520) may determine the sub-region into which the primary data or the primary indicator corresponding to the primary data is moved in the second region based on an end position of the primary data or the primary indicator corresponding to the primary data on the trajectory. For example, when the end position of the primary data or the primary indicator corresponding to the primary data is identified, based on the coordinates of the end position, to be in a sub-region, processing module 440 (e.g., user instruction identification unit 520) may determine that the primary data or the primary indicator corresponding to the primary data is moved into the sub-region. In some embodiments, one or more data loading commands may be determined based on the initial position, the pause position, and/or the end position of a trajectory of the primary data or the primary indicator corresponding to the primary data, regardless of portions of the trajectories between two positions of the initial position, the pause position, and/or the end position.

In some embodiments, processing module 440 (e.g., user instruction identification unit 520) may determine the sub-region where the primary data or the primary indicator corresponding to the primary data is moved in the second region based on a pause position of the primary data or the primary indicator corresponding to the primary data on the trajectory. For example, when the pause position of the primary indicator is identified, based on the coordinates of the pause position, to be in a sub-region, processing module 440 (e.g., user instruction identification unit 520) may determine that the primary indicator is moved into the sub-region.

In 730, the primary data loading command may be determined based on the sub-region of the second region where the end position of the primary data or the primary indicator corresponding to the primary data is. The primary data loading command may direct the mode in which the primary data is to be displayed in the second region on the user interface. In some embodiments, processing module 440 (e.g., load command determination unit 530) may determine the primary data loading command based on the sub-region into which the end position of the primary indicator is moved in the second region. For example, when the sub-region where the end position of the primary data or the primary indicator corresponding to the primary data is moved into the second region indicating a data loading command of duplication, processing module 440 (e.g., load command determination unit 530) may determine the primary data loading command to include duplicating the primary data display on the user interface based on the sub-region.

It should be noted that the above descriptions of process 700 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, process 700 may include one or more other operations. However, those variations and modifications also fall within the scope of the present disclosure.

Figure 8:
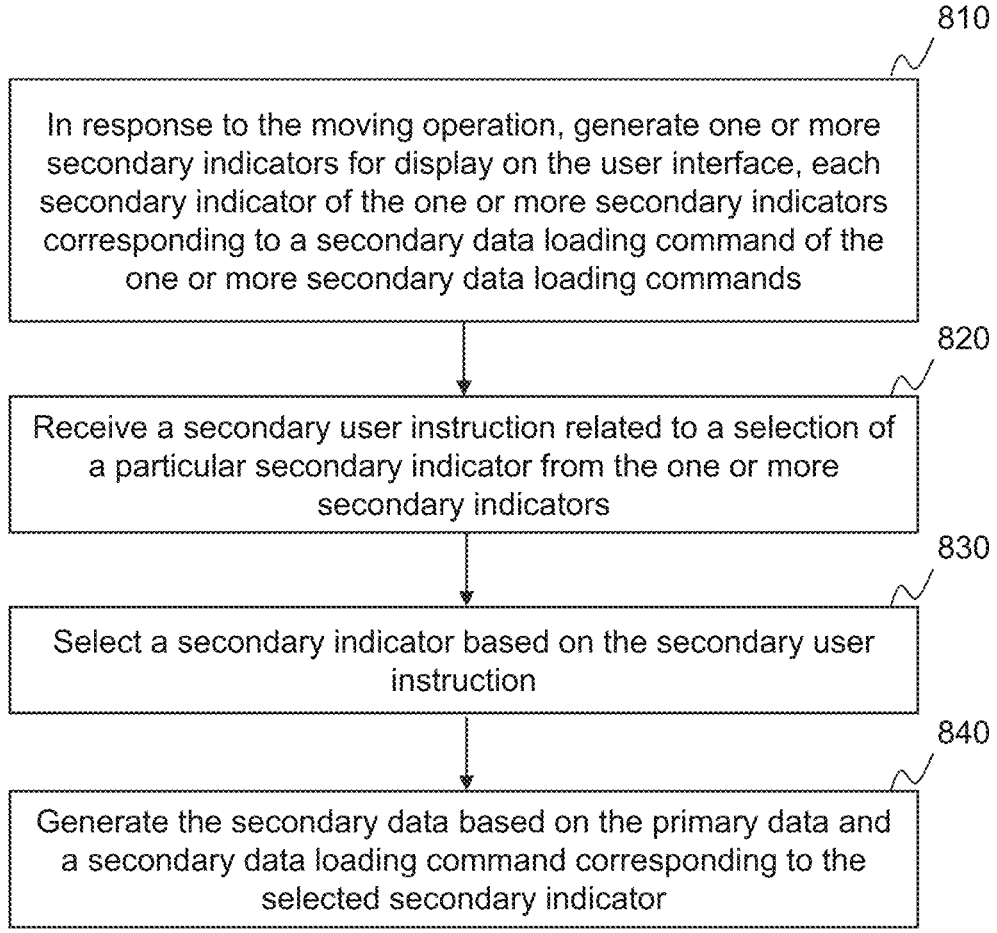
FIG. 8 is a flowchart illustrating an exemplary process for data loading according to some embodiments of the present disclosure.

FIG. 8 is a flowchart illustrating an exemplary process for data loading according to some embodiments of the present disclosure. Process 800, or a portion thereof, may be implemented on processing device 140 (e.g., CPU 220 illustrated in FIG. 2, CPU 340 illustrated in FIG. 3, or one or more modules in processing device 140 illustrated in FIG. 4). The operations of the illustrated process presented below are intended to be illustrative.

In 810, in response to a moving operation, one or more secondary indicators to be displayed on a user interface may be generated. The one or more secondary indicators may be caused to be displayed in a second region on the user interface. Each secondary indicator of the one or more secondary indicators may correspond to a secondary data loading command of the one or more secondary data loading commands. A secondary data loading command, in addition to a primary data loading command, may also direct the mode in which the primary data is to be displayed in, e.g., the second region on the user interface. In some embodiments, while the pause position of the primary data or the primary indicator is determined to be in a sub-region of the second region, processing module 440 (e.g., indicator generation unit 510) may generate the one or more secondary indicators for display in the sub-region on the user interface. In some embodiments, the one or more secondary indicators may be displayed adjacent to the primary data or the primary indicator moved in the second region. In some embodiments, the one or more secondary indicators may be displayed adjacent to the cursor when the primary indicator or the primary data is moved into the second region by the cursor. A secondary indicator may be an icon indicating a secondary data loading command. An icon may correspond to a secondary data loading command. Exemplary icons of the secondary data loading command may include a circular icon, a square icon, etc.

In some embodiments, when the primary data or the primary indicator corresponding to the primary data is moved from the first region to the second region, a loading command list may be displayed in the second region. The loading command list may include one or more sub-regions, and each of the one or more sub-regions may include a secondary indicator corresponding to a secondary data loading command.

In 820, a secondary user instruction related to a selection of a particular secondary indicator from the one or more secondary indicators may be received. In some embodiments, processing module 440 may receive the secondary user instruction related to a selection of a particular secondary indicator from the one or more secondary indicators. In some embodiments, when the primary indicator or the primary data is dragged into the second region by the cursor, the secondary user instruction may be provided by moving the cursor to a particular secondary indicator and releasing the cursor (e.g., releasing the primary indicator or the primary data) at the particular secondary indicator. In some embodiments, the secondary user instruction may be provided by moving the primary indicator to overlap or partially overlap a particular secondary indicator of the one or more secondary indicators. In some embodiments, the secondary user instruction may be provided by moving the primary indicator to an area where a particular secondary indicator is located regardless of whether the primary indicator at least partially overlaps the particular secondary indicator. The moving operation that moves the primary indicator to overlap or partially overlap a particular secondary indicator may include a gesture of the user, an operation performed by at least a portion of the user with or without the assistance of an external device (e.g., a mouse, a stylus, etc.), etc.

In 830, a secondary indicator may be selected based on the secondary user instruction. In some embodiments, processing module 440 may select the secondary indicator of the one or more secondary indicators based on the secondary user instruction. For instance, when the end position of the primary data or the primary indicator is determined, based on the coordinates of the end position, to be in an area containing a particular secondary indicator, the particular secondary indicator may be selected by processing module 440.

In 840, the secondary data may be generated based on the primary data and a secondary data loading command corresponding to the selected secondary indicator. In some embodiments, processing module 440 (e.g., secondary data generation unit 540) may generate the secondary data based on the primary data and the secondary data loading command corresponding to the selected secondary indicator. For example, when the secondary data loading command directs to generate a CT image based on CT imaging data in the primary data (e.g., as part of the primary data including the medical history of a patient, etc.) for display in the form of an image in the second region on the user interface, processing module 440 (e.g., secondary data generation unit 540) may generate the secondary data for display in the second region of the user interface according to the secondary data loading command. In this situation, the secondary data may be a CT image based on the CT imaging data in the primary data to be displayed. Relevant descriptions may be found elsewhere in the present disclosure.

It should be noted that the above descriptions of process 800 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, process 800 may include one or more other operations. However, those variations and modifications also fall within the scope of the present disclosure.

Figure 10:
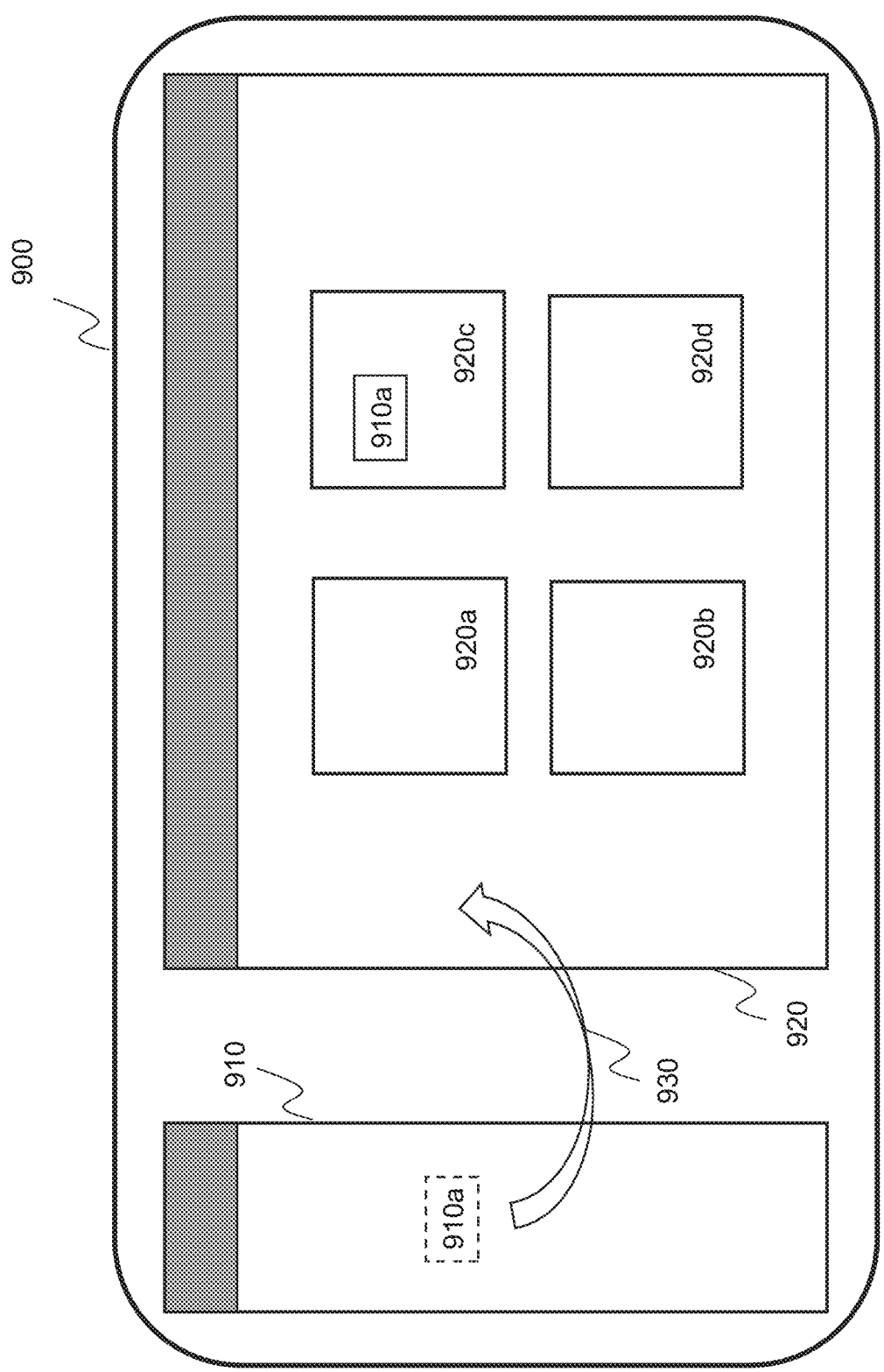
Figure 11:
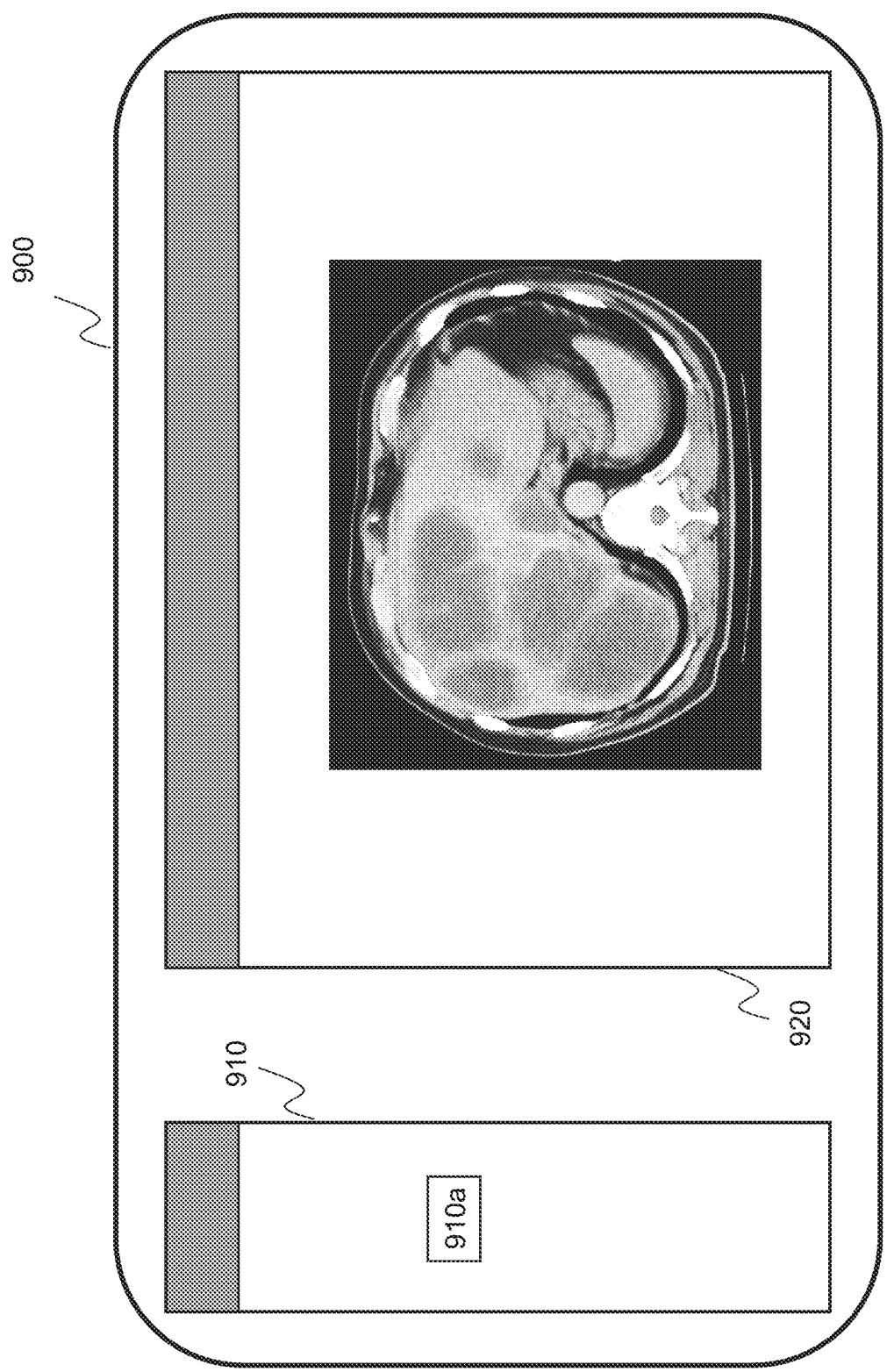

FIGS. 9-11 are schematic diagrams illustrating an exemplary process for data loading according to some embodiments of the present disclosure. The process for data loading, or a portion thereof, may be implemented on processing device 140 (e.g., CPU 220 illustrated in FIG. 2, CPU 340 illustrated in FIG. 3, or one or more modules in processing device 140 illustrated in FIG. 4). The schematic diagrams of the illustrated process presented below are intended to be illustrative.

As shown in FIG. 9, interface 900 may include first region 910 and second region 920. Box 910a may indicate the primary indicator corresponding to the primary data. Arrow 930 (also referred to as moving operation 930) may indicate the moving operation that moves box 910a from first region 910 to second region 920 of user interface 900. Second region 920 may include sub-region 920a, sub-region 920b, sub-region 920c, and sub-region 920d. Merely by way of example, with reference to medical data of an object, sub-region 920a may correspond to a primary data loading command for loading a duplicate of the primary data (or a portion thereof) to be displayed in the form of text in second region 920, and sub-region 920b may correspond to a primary data loading command for double checking the primary data (or a portion thereof) in second region 920, and sub-region 920c may correspond to a primary data loading command for loading an image (e.g., a CT image, a MRI image, a PET image, etc.) of the primary data (or a portion thereof) in second region 920, and sub-region 920d may correspond to a primary data loading command for loading an image (e.g., a CT image, a MRI image, a PET image, etc.) of the primary data (or a portion thereof) to be compared with another image (e.g., a CT image, a MRI image, a PET image, etc.) of other data in second region 920.

By performing moving operation 930 by a user (e.g., a doctor), box 910a may be moved from an initial position in first region 910 to an end position in second region 920. When box 910a is at the end position in second region 920 and box 910a (or the cursor for moving the box 910a) overlaps or partially overlaps a sub-region of second region 920, processing module 440 may determine the primary data loading command based on the sub-region. As shown in FIG. 10, box 910a is moved to sub-region 920c of second region 920, processing module 440 may determine that the primary data loading command is to load an image (e.g., a CT image) of the primary data to be displayed in second region 920. Processing module 440 may then generate the secondary data for display based on the primary data and the primary data loading command. FIG. 11 is a schematic diagram illustrating an exemplary appearance of user interface 900 after data loading is performed based on the user instruction. A CT image of the primary data of a patient may be displayed in second region 920 on user interface 900. In some embodiments, when the moving operation 930 is performed by the user via a mouse, the box 910a may follow or not follow the cursor. When the box 910a does not follow the cursor, the processing module 440 may determine the primary data loading command based on the sub-region when the cursor is at the end position in second region 920.

It should be noted that the above descriptions of interface 900 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, interface 900 may include one or more other sub-regions corresponding to one or more other primary data loading commands. In some embodiments, interface 900 may include one or more other primary indicators corresponding to other data. However, those variations and modifications also fall within the scope of the present disclosure.

FIGS. 12-15 are schematic diagrams illustrating an exemplary process for data loading according to some embodiments of the present disclosure. The process for data loading, or a portion thereof, may be implemented on processing device 140 (e.g., CPU 220 illustrated in FIG. 2, CPU 340 illustrated in FIG. 3, or one or more modules in processing device 140 illustrated in FIG. 4). The schematic diagrams of the illustrated process presented below are intended to be illustrative.

Figure 12:
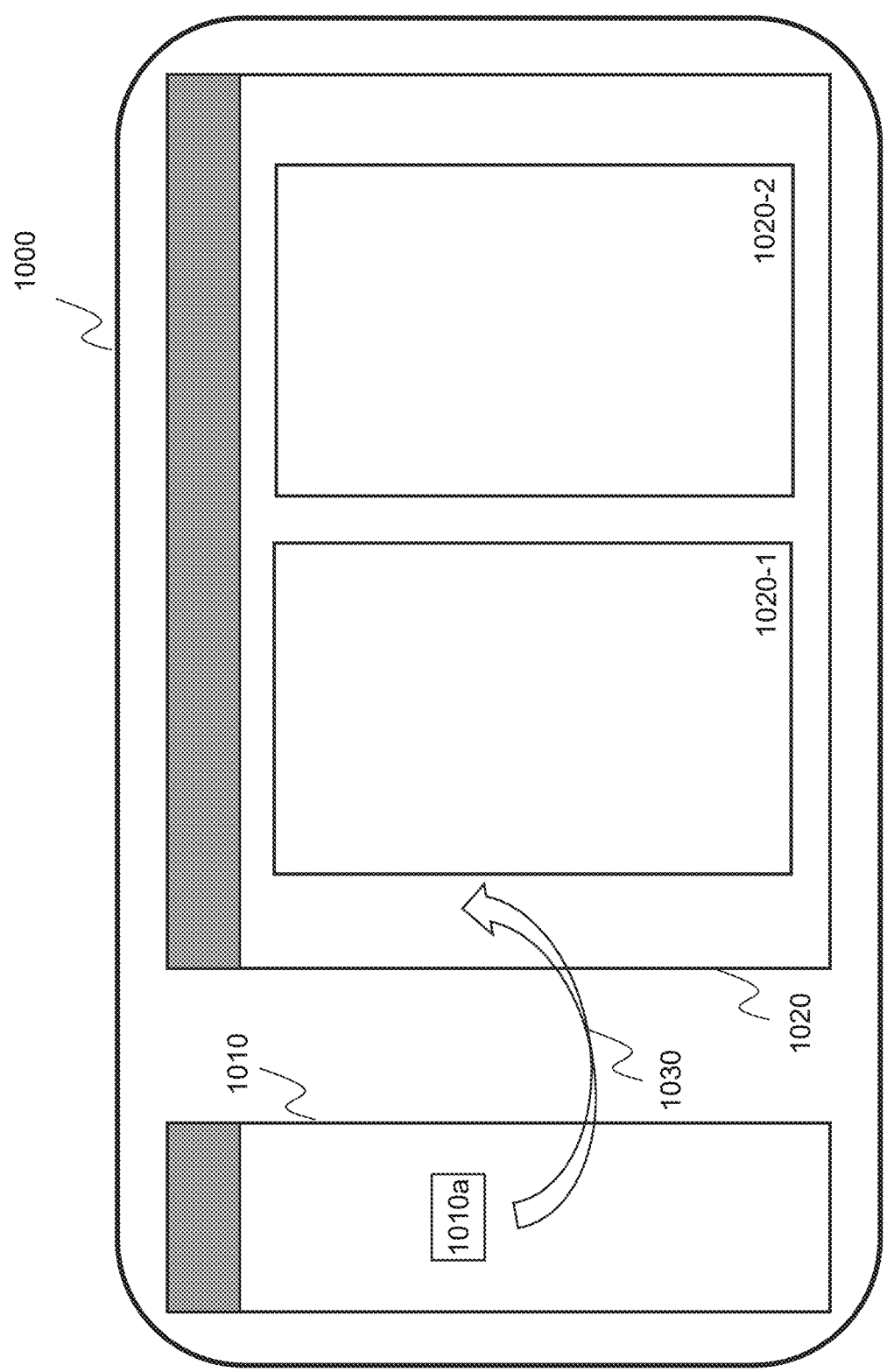
FIGS. 12-15 are schematic diagrams illustrating an exemplary process for data loading according to some embodiments of the present disclosure.

As shown in FIG. 12, interface 1000 may include first region 1010 and second region 1020. Box 1010a may indicate the primary indicator corresponding to the primary data. Arrow 1030 (also referred to as moving operation 1030) may indicate the moving operation that moves box 1010a from first region 1010 to second region 1020 of user interface 1000. Second region 1020 may further include sub-region 1020-1 and sub-region 1020-2. With reference to medical data of an object, sub-region 1020-1 may be an area for managing registration information of the object (e.g., basic information of a patient). Sub-region 1020-2 may be an area for managing treatment information of the patient (e.g., medical history of the patient, historical images generated during treatment, etc.).

Figure 13:
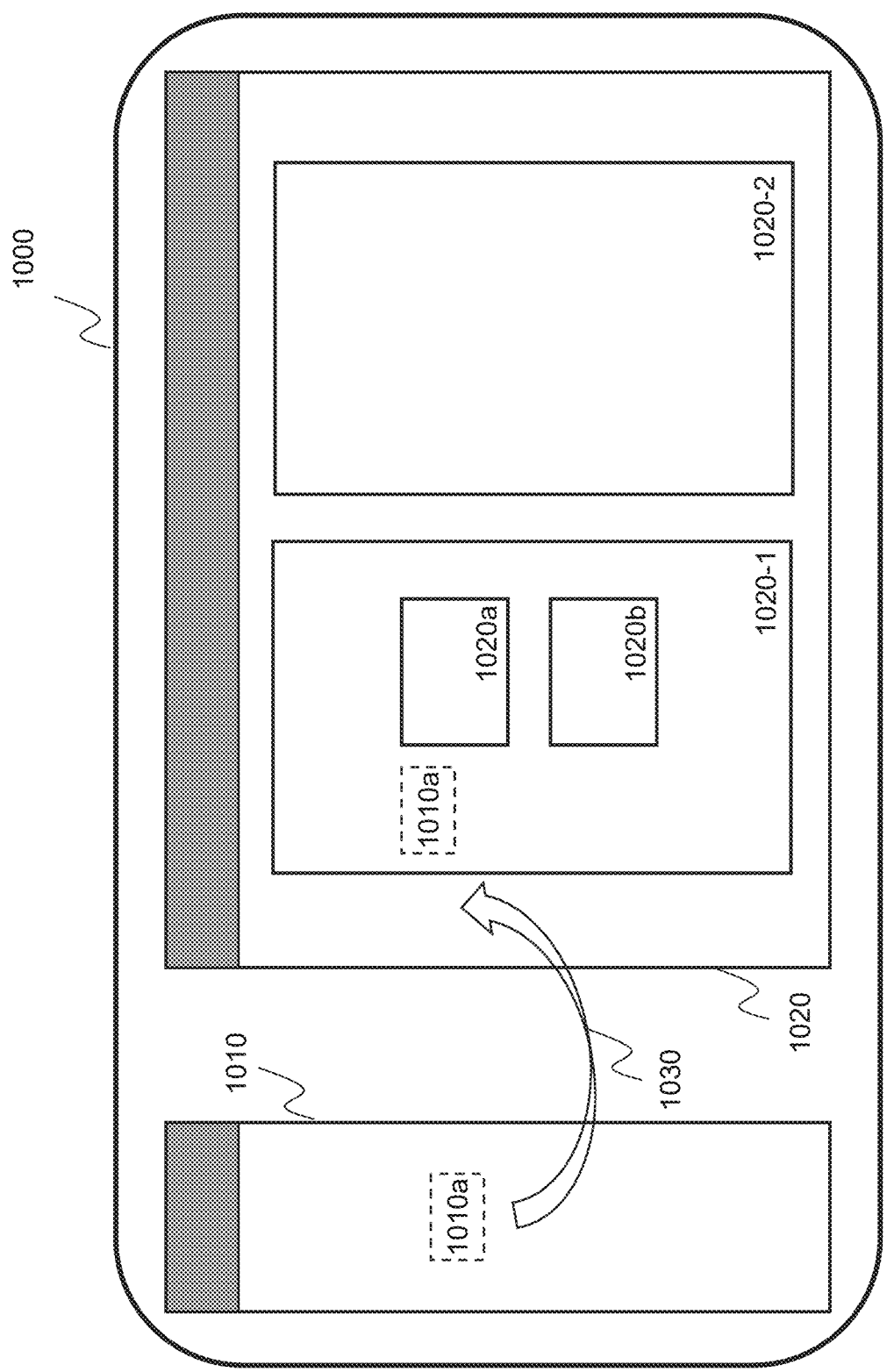

By performing moving operation 1030 by a user (e.g., a doctor), box 1010a may be moved from an initial position in first region 1010 to a pause position in second region 1020. In some embodiments, when the moving operation 1030 is performed by the user via a mouse, the box 1010a may follow or not follow the cursor. When the moving of box 1010a (or the cursor for moving the box 1010a) is paused at the pause position in second region 1020 and box 1010a (or the cursor for moving the box 1010a) overlaps or partially overlaps a sub-region of second region 1020, processing module 440 may generate one or more secondary indicators in the sub-region. As shown in FIG. 13, the pause position of box 1010a (or the cursor for moving the box 1010a) is in sub-region 1020-1 of second region 1020, processing module 440 may generate secondary indicator 1020a and secondary indicator 1020b in sub-region 1020-1. Although not shown in FIG. 13, if the pause position of box 1010a (or the cursor for moving the box 1010a) is in sub-region 1020-2 of second region 1020, processing module 440 may generate one or more secondary indicators in sub-region 1020-2 to allow user selection. Secondary indicator 1020a may be displayed adjacent to box 1010a. Merely by way of example, secondary indicator 1020a may correspond to a secondary data loading command for loading the patient's registration information in second region 1020. Secondary indicator 1020b may correspond to a secondary data loading command for double checking the patient's registration information in second region 1020. Further, the user may resume the moving of box 1010a from the pause position in second region 1020 to an end position in second region 1020. When box 1010a (or the cursor for moving the box 1010a) is at the end position in second region 1020 and box 1010a (or the cursor for moving the box 1010a) overlap or partially overlap a secondary indicator in sub-region 1020-1, processing module 440 may determine the secondary data loading command based on the selected secondary indicator.

Figure 14:
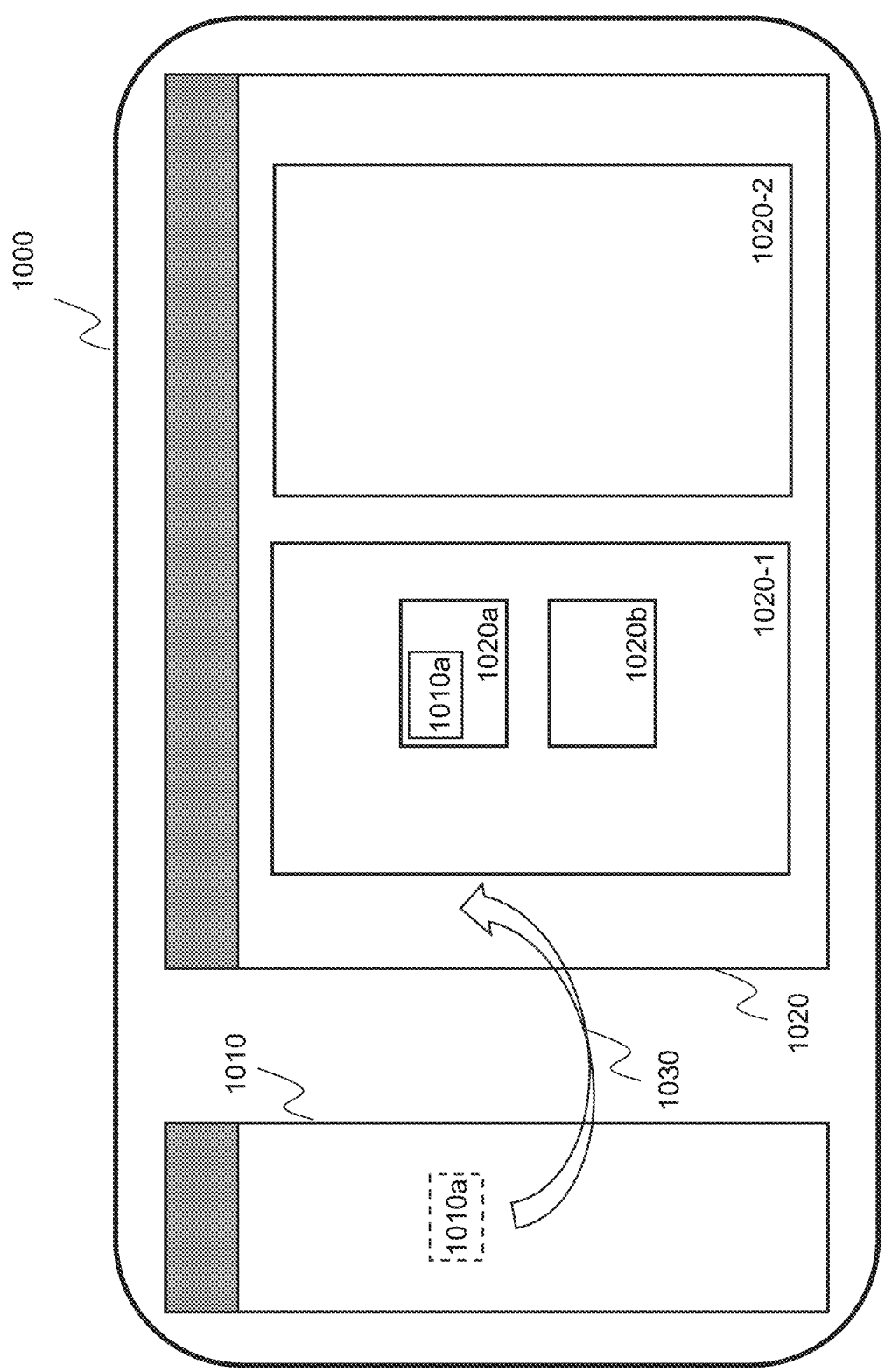
Figure 15:
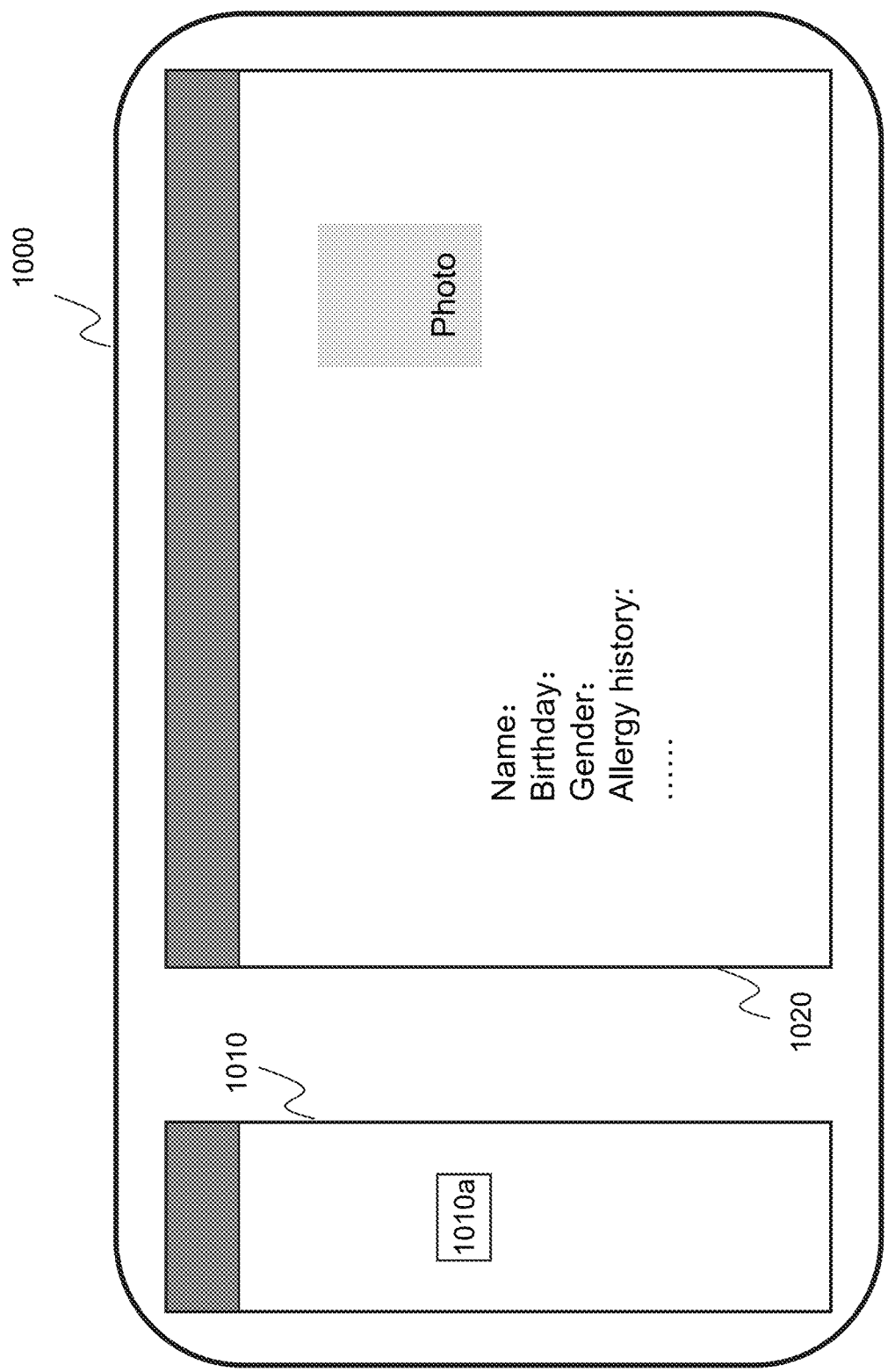

As shown in FIG. 14, secondary indicator 1020a is selected, and the corresponding secondary data loading command is to load the patient registration information in second region 1020. Processing module 440 may then generate the secondary data for display based on the primary data and the selected secondary data loading command. FIG.

15 is a schematic diagram illustrating an exemplary appearance of user interface 1000 after data loading is performed according to the user instruction. The patient registration information of the primary data may be displayed in second region 1020 on user interface 1000. In some embodiments, when the moving operation 1030 is performed by the user via a mouse, the box 1010a may follow or not follow the cursor. When the box 1010a does not follow the cursor, the processing module 440 may determine the primary data loading command based on the sub-region when the cursor is at the end position in second region 1020.

It should be noted that the above descriptions of interface 1000 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, interface 1000 may include one or more other secondary indicators corresponding to one or more other secondary data loading commands. In some embodiments, interface 1000 may include one or more other primary indicators corresponding to other data. However, those variations and modifications also fall within the scope of the present disclosure.

FIGS. 16-23 are schematic diagrams illustrating still another exemplary process for data loading according to some embodiments of the present disclosure. The process for data loading, or a portion thereof, may be implemented on processing device 140 (e.g., CPU 220 illustrated in FIG. 2, CPU 340 illustrated in FIG. 3, or one or more modules in processing device 140 illustrated in FIG. 4). The schematic diagrams of the illustrated process presented below are intended to be illustrative.

Figure 16:
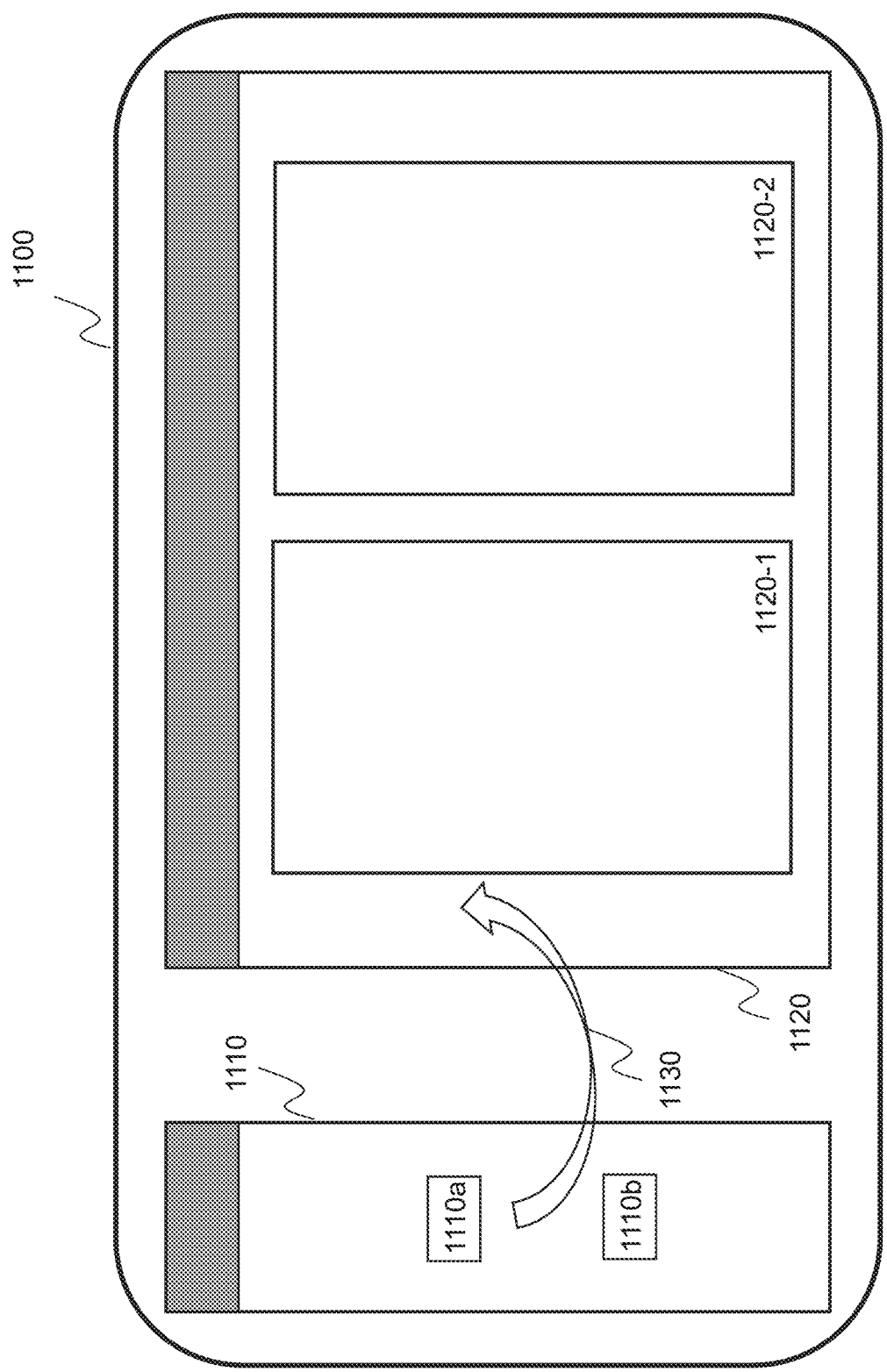
FIGS. 16-23 are schematic diagrams illustrating an exemplary process for data loading according to some embodiments of the present disclosure; and, FIGS. 24-25 are schematic diagrams illustrating an exemplary process for data loading according to some embodiments of the present disclosure.

As shown in FIG. 16, interface 1100 may include first region 1110 and second region 1120. Box 1110a may indicate a primary indicator corresponding to the primary data. Box 1110b may indicate a primary indicator corresponding to other data. Arrow 1130 (also referred to as moving operation 1130) may indicate the moving operation that moves box 1110a from first region 1110 to second region 1120 of user interface 1100. Second region 1120 may further include sub-region 1120-1 and sub-region 1120-2. With reference to medical data of an object, sub-region 1120-1 may be an area for managing patient treatment information (e.g., patient past medical history, historical images generated during treatment, etc.). Sub-region 1120-2 may be an area for managing patient registration information (i.e., patient basic information).

Figure 17:
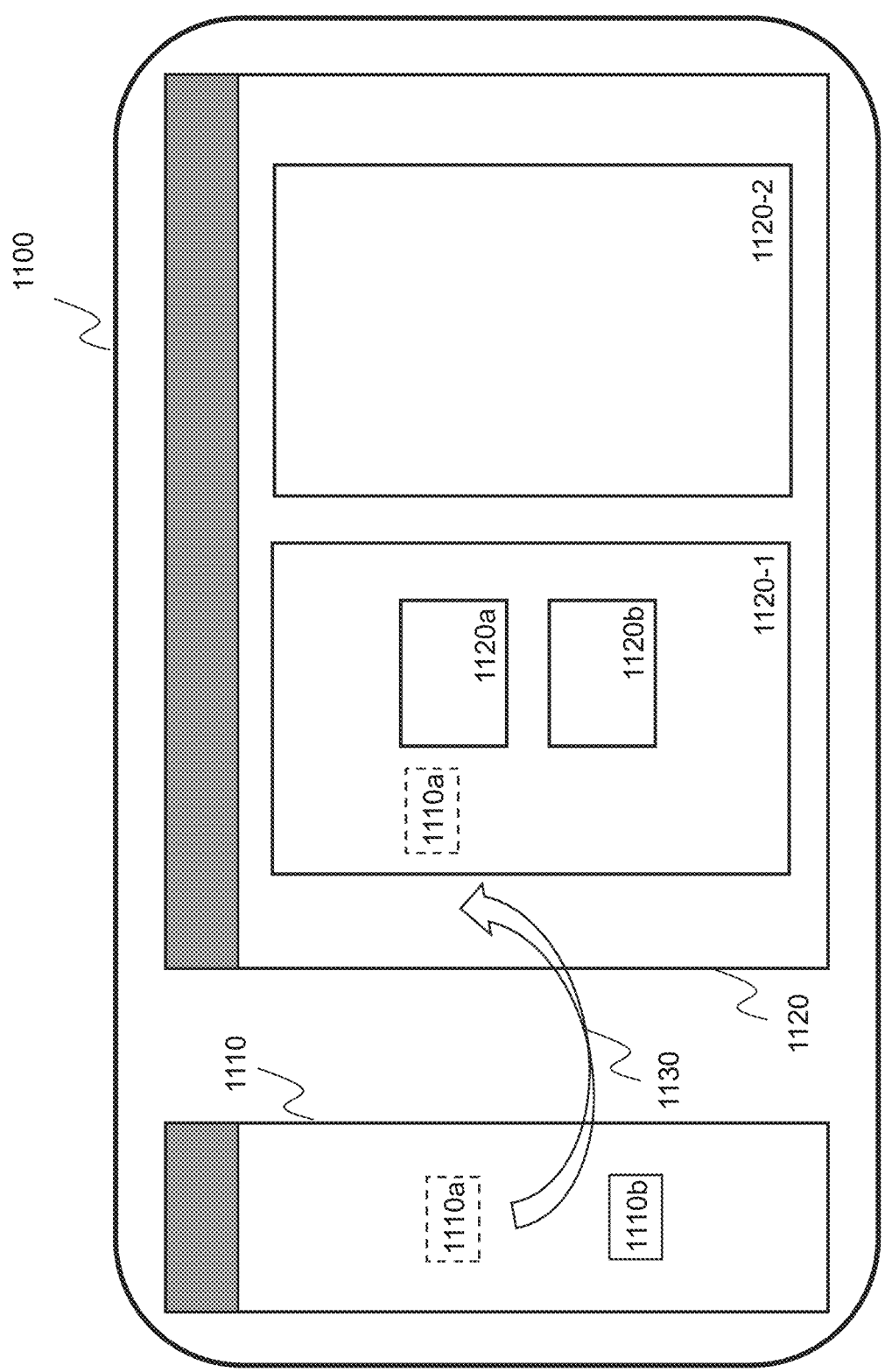

By performing moving operation 1130 by a user (e.g., a doctor), box 1110a may be moved from an initial position in first region 1110 to a pause position in second region 1120. In some embodiments, when the moving operation 1130 is performed by the user via a mouse, the box 1110a may follow or not follow the cursor. When box 1110a (or the cursor for moving the box 1110a) is at the pause position in second region 1120 and box 1110a (or the cursor for moving the box 1110a) overlaps or partially overlap a sub-region of second region 1120, processing module 440 may generate one or more secondary indicators in the sub-region. As shown in FIG. 17, the pause position of box 1110a (or the cursor for moving the box 1110a) is in sub-region 1120-1 of second region 1120, processing module 440 may generate secondary indicator 1120a and secondary indicator 1120b in sub-region 1120-1. Although not shown in FIG. 17, if the pause position of box 1110a (or the cursor for moving the box 1110a) is in sub-region 1120-2 of second region 1020, processing module 440 may generate one or more secondary indicators in sub-region 1120-2 to allow user selection. Secondary indicator 1120a may be displayed adjacent to box 1110a (or the cursor for moving the box 1110a). Merely by way of example, secondary indicator 1120a may correspond to a secondary data loading command for loading a CT image based on the primary data in second region 1120. Secondary indicator 1120b may correspond to a secondary data loading command for loading a CT image based on the primary data for comparison with another image of the same object (e.g., a CT image taken at a different time, an MRI image of the same object, a CT image of a different object, etc.) in second region 1120. Further, the user may resume the moving of box 1110a (or the cursor for moving the box 1110a) from the pause position in second region 1120 to an end position in second region 1120. When box 1110a (or the cursor for moving the box 1110a) is at the end position in second region 1120 and box 1110a (or the cursor for moving the box 1110a) overlaps or partially overlaps a secondary indicator in sub-region 1120-1, processing module 440 may determine the secondary data loading command based on the selected secondary indicator.

Figure 18:
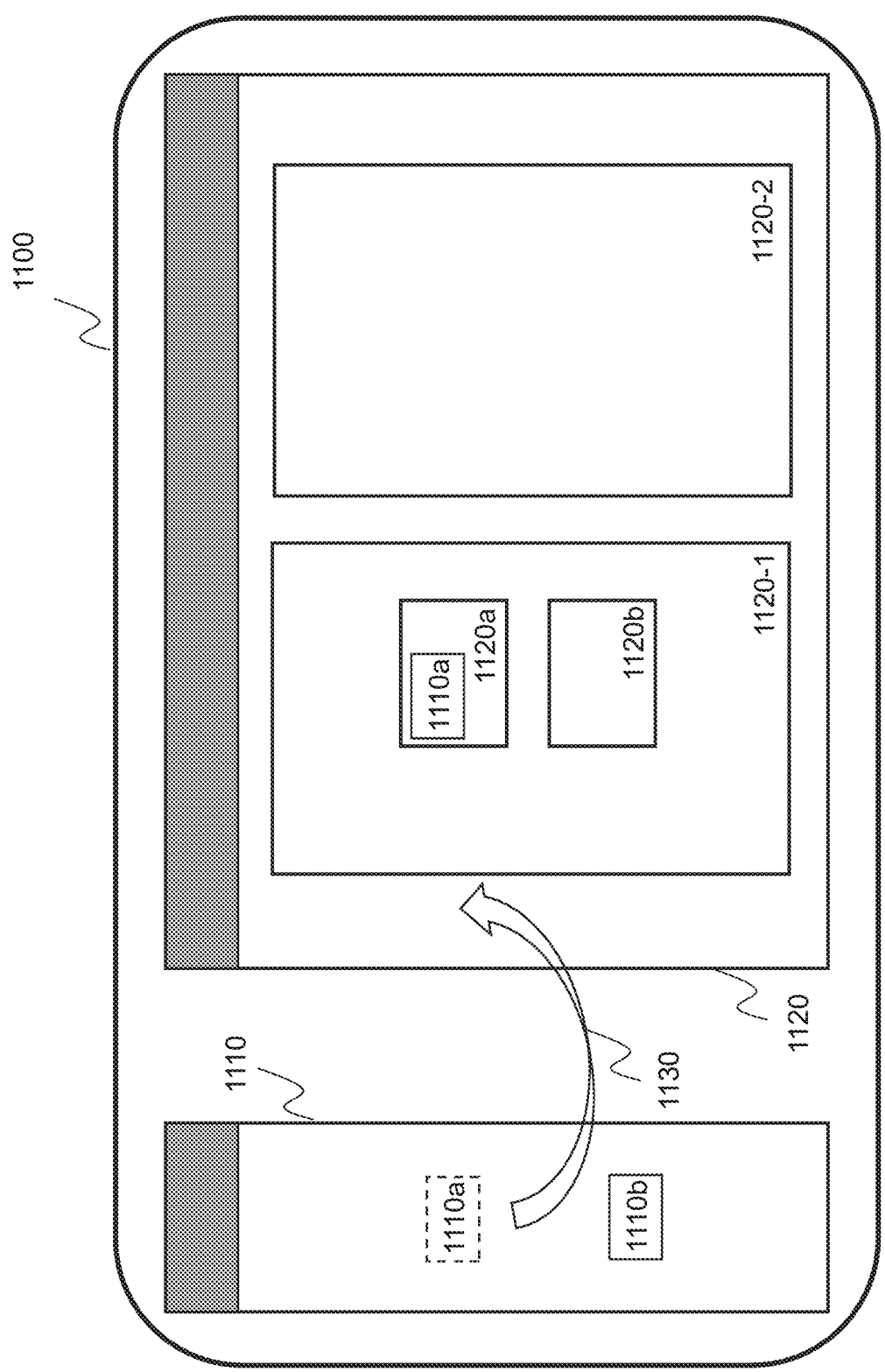

As shown in FIG. 18, secondary indicator 1120a is selected, and the corresponding secondary data loading command is generated to load a CT image in the primary data in second region 1120. Processing module 440 may then generate the secondary data based on the primary data and the selected secondary data loading command.

Figure 19:
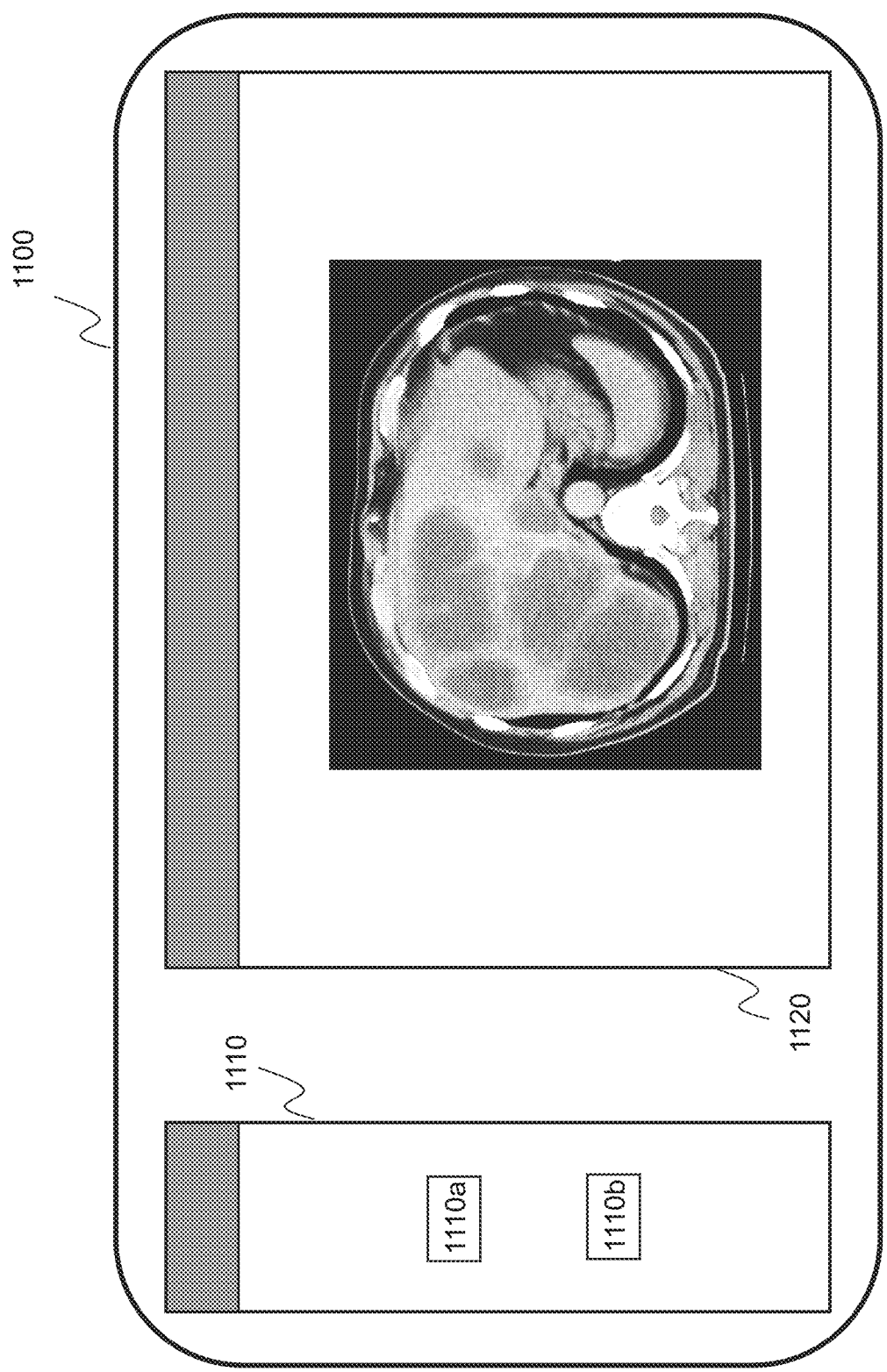

FIG. 19 is a schematic diagram illustrating an exemplary appearance of user interface 1100 after data loading is performed according to the user instruction. The CT image of the primary data may be displayed in second region 1120 on user interface 1100.

Figure 20:
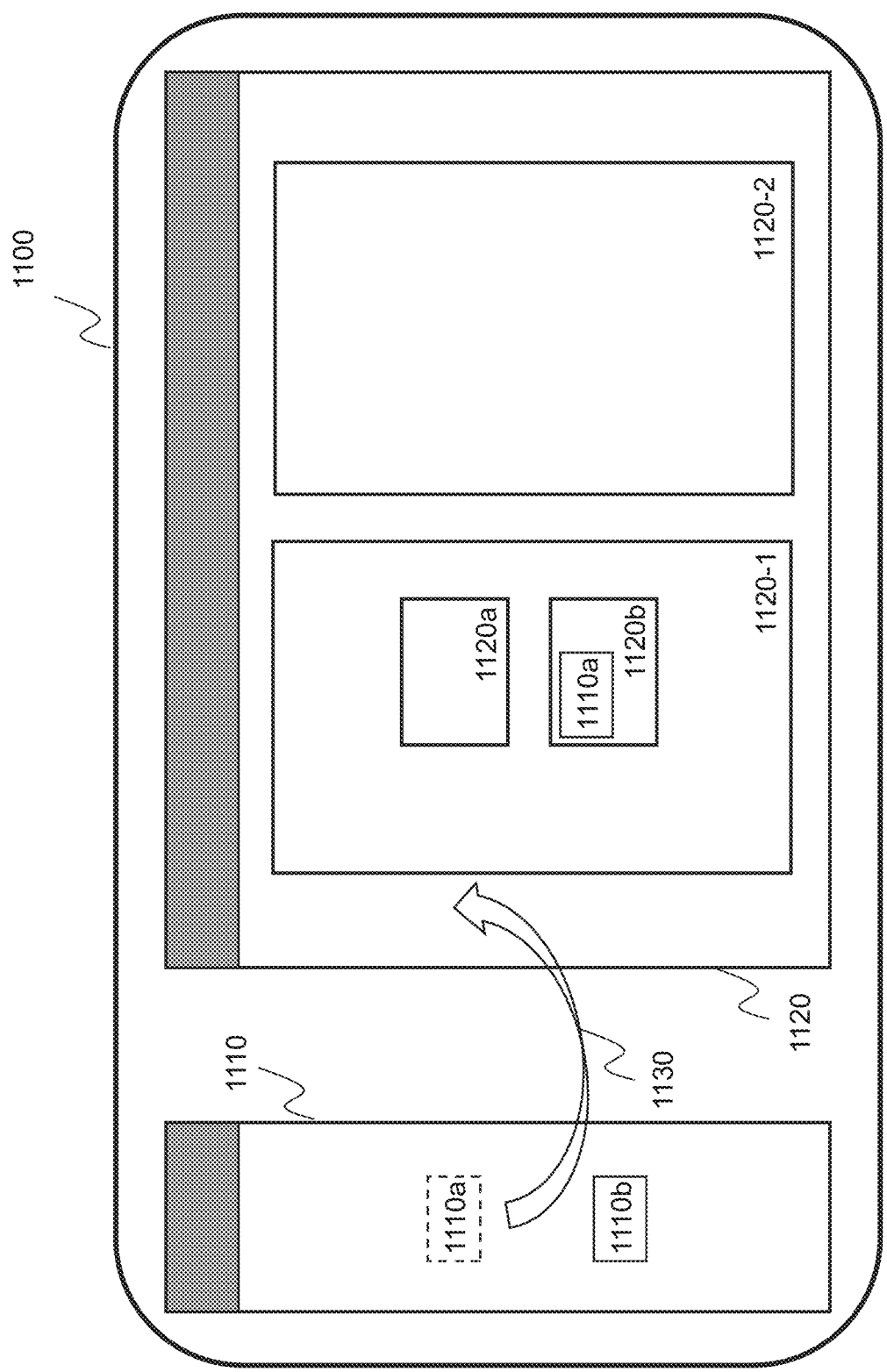
Figure 21:
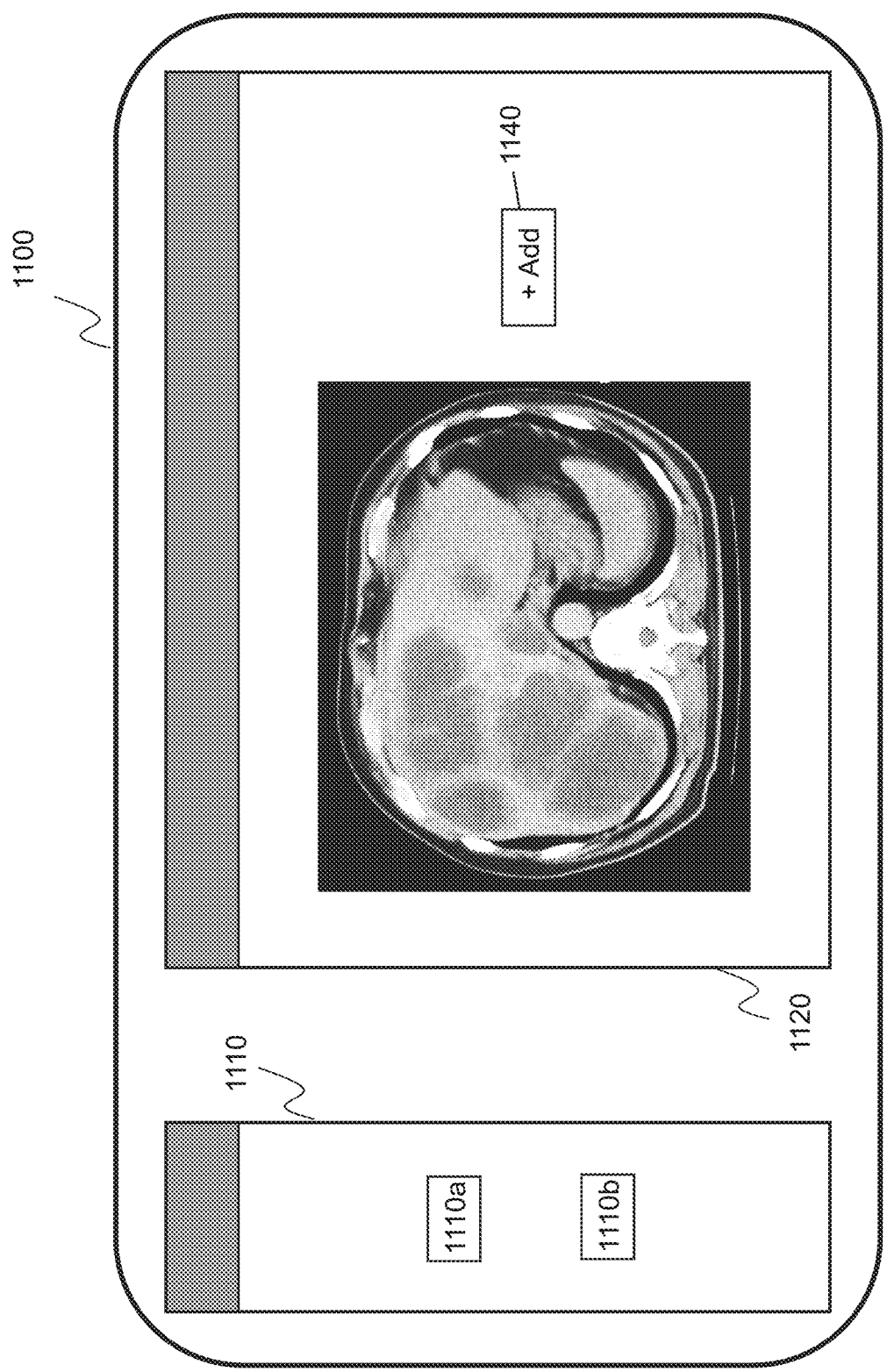

If box 1110a (or the cursor for moving the box 1110a) is at the end position in second region 1120 and overlaps or partially overlaps secondary indicator 1120b in sub-region 1120-1, secondary indicator 1120b may be selected by the user. As shown in FIG. 20, processing module 440 may determine the secondary data loading command based on secondary indicator 1120b. The secondary data loading command corresponding to secondary indicator 1120b may be loading a CT image of the primary data for comparison with another CT image in second region 1120. Processing module 440 may then generate the secondary data based on the primary data and the secondary data loading command. FIG. 21 is a schematic diagram illustrating an exemplary appearance of user interface 1100 during the data loading. The CT image of the primary data may be displayed in second region 1120 on user interface 1100, and box 1140 may be generated in second region 1120 for adding another CT image of other data to compare with the CT image of the primary data.

Figure 22:
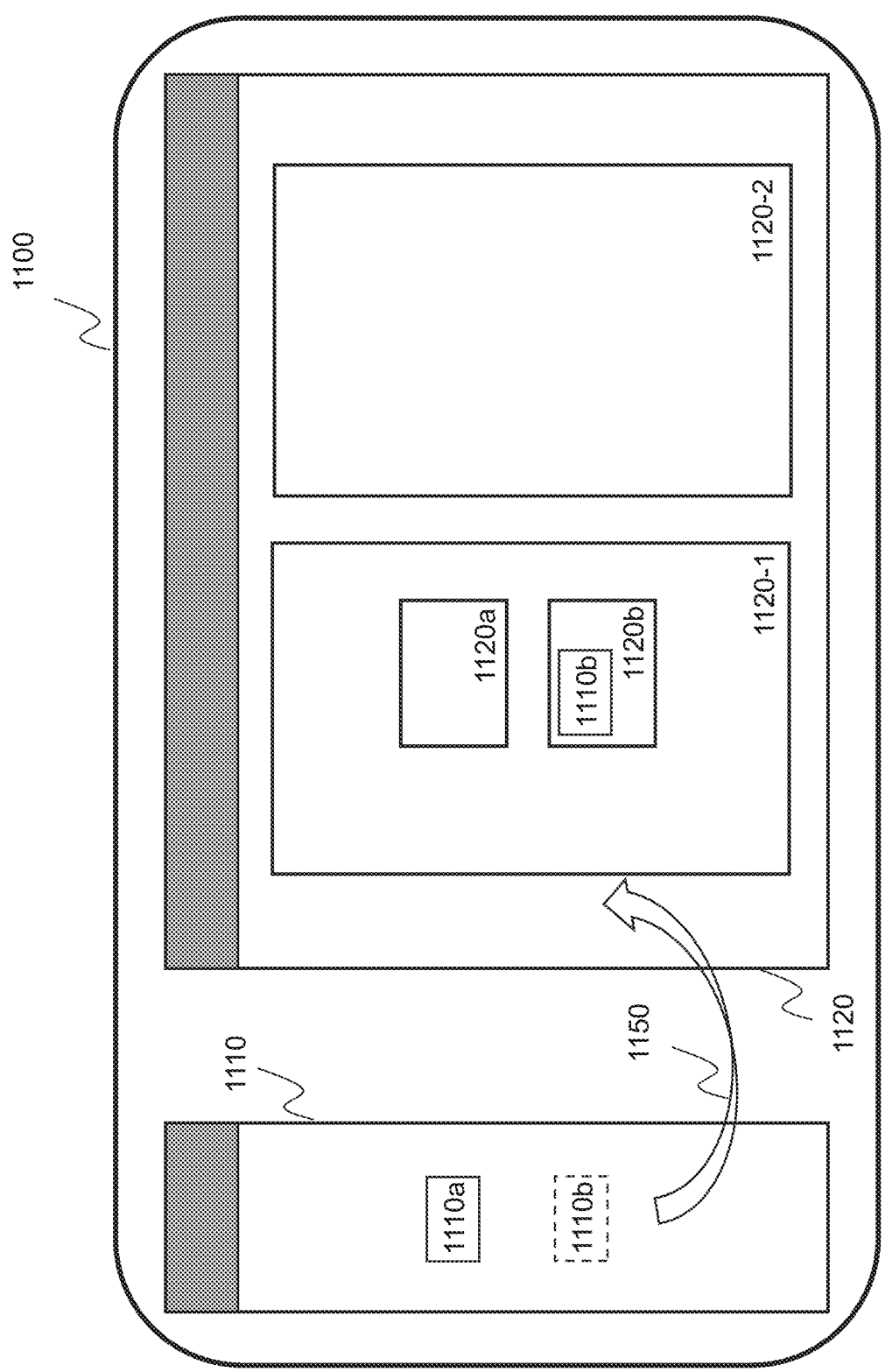

By touching/clicking box 1140, user interface 1100 may return to the appearance as shown in FIG. 16. After moving operation 1150 is detected, as shown in FIG. 22, box 1110b (or the cursor for moving the box 1110b) is at the end position in second region 1120 and overlaps or partially overlaps secondary indicator 1120b in sub-region 1120-1. Processing module 440 may, in second region 1120, load a second CT image corresponding to box 1110b for comparison with the CT image of the primary data corresponding to box 1110a.

Figure 23:
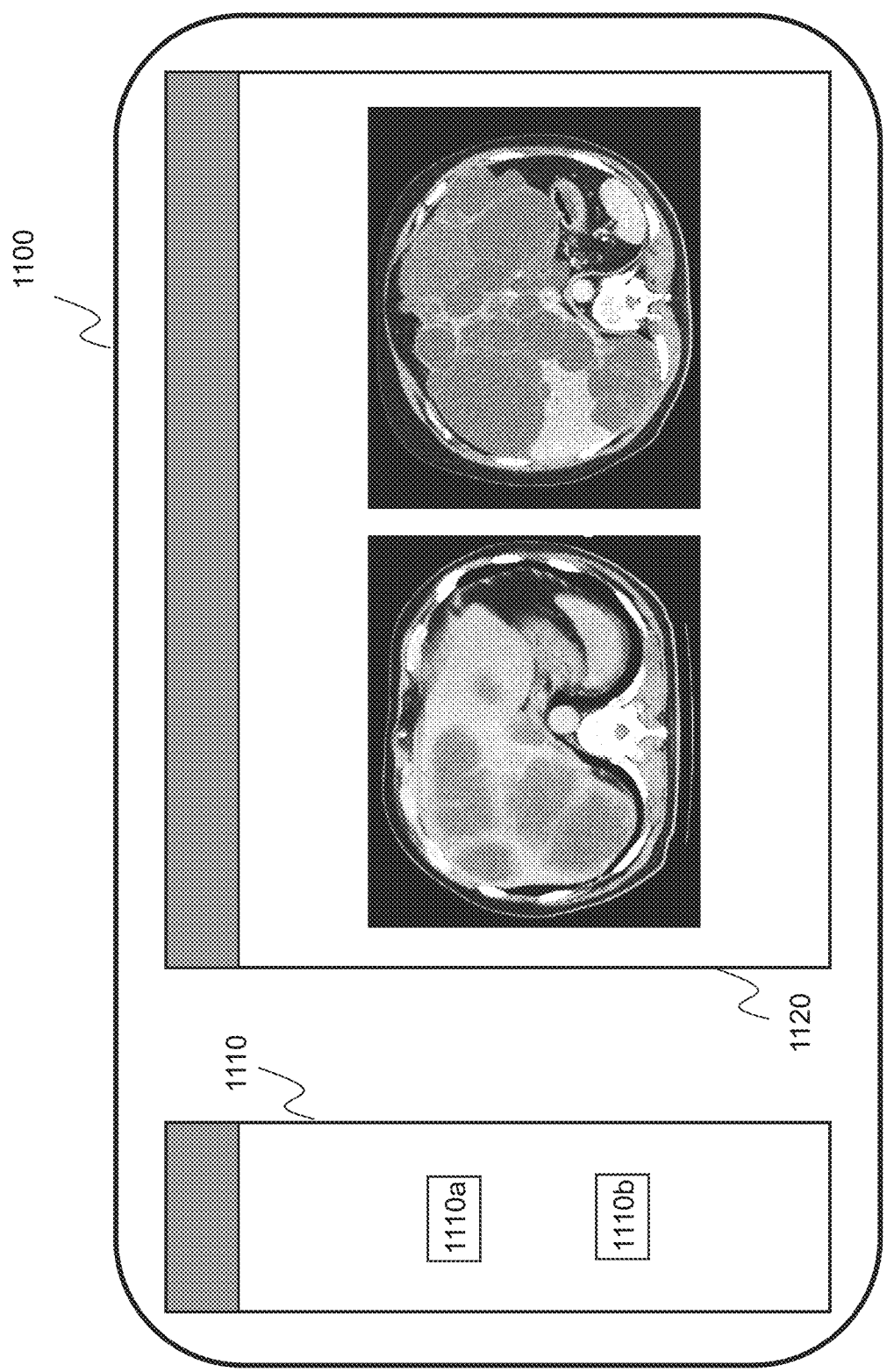

FIG. 23 is a schematic diagram illustrating an exemplary appearance of user interface 1100 after the data loading. The CT image of the primary data and the CT image of other data may be displayed in second region 1120 on user interface 1100.

It should be noted that the above descriptions of interface 1100 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, interface 1100 may include one or more other secondary indicators corresponding to one or more other secondary data loading commands. In some embodiments, interface 1100 may include one or more other primary indicators corresponding to other data. However, those variations and modifications also fall within the scope of the present disclosure.

Figure 24:
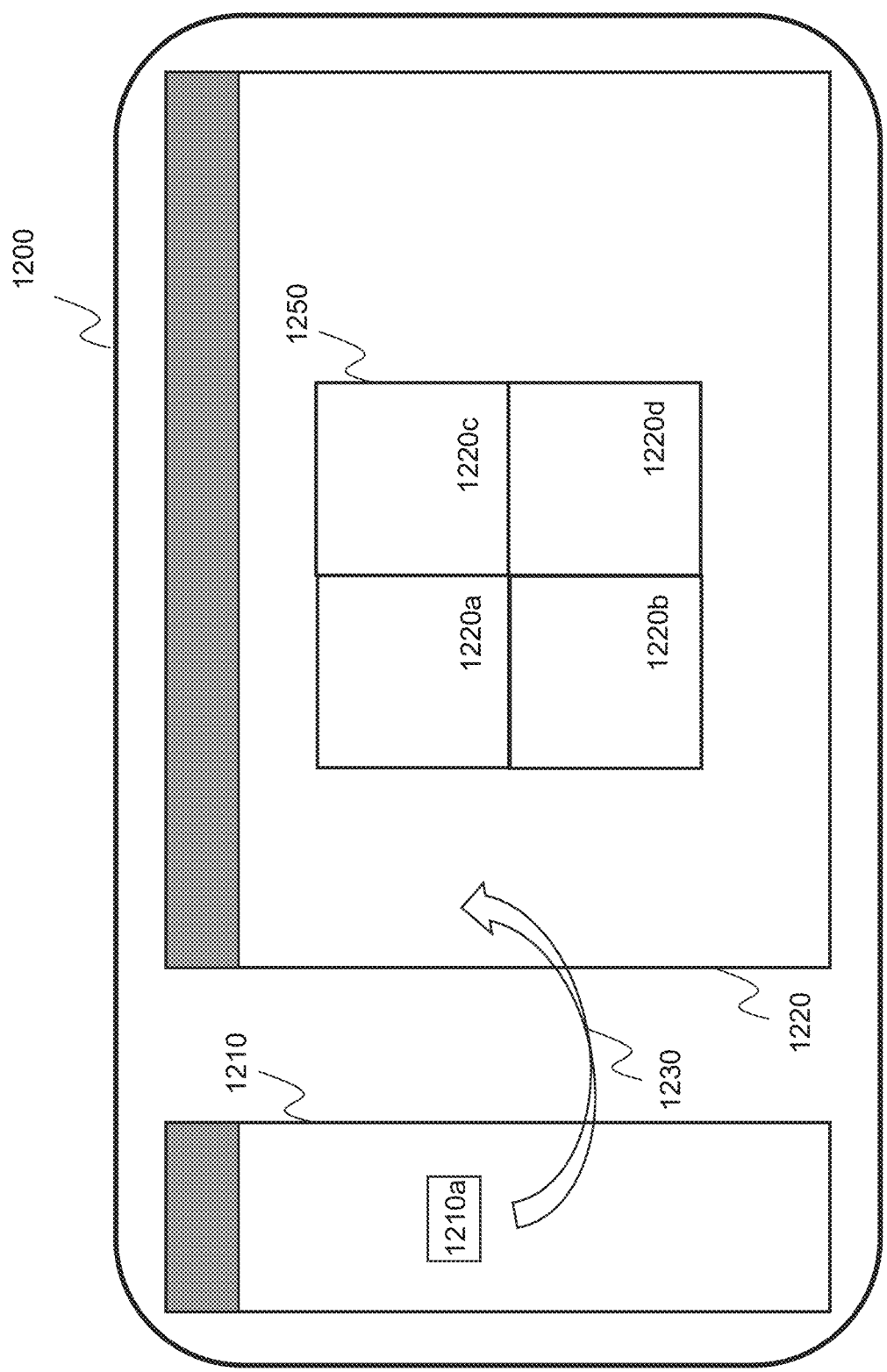
Figure 25:
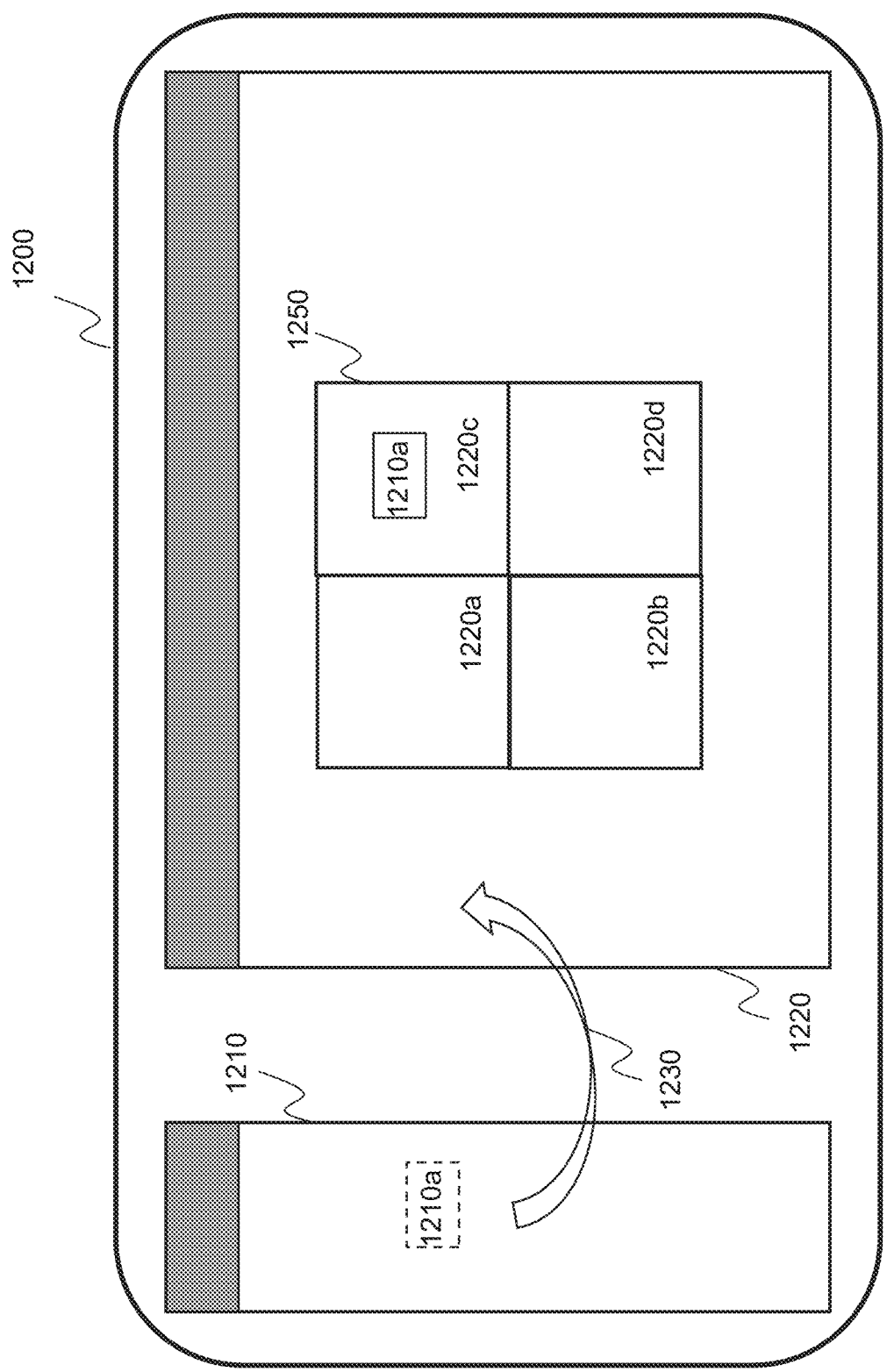

FIGS. 24-25 are schematic diagrams illustrating an exemplary process for data loading according to some embodiments of the present disclosure. The process for data loading, or a portion thereof, may be implemented on processing device 140 (e.g., CPU 220 illustrated in FIG. 2, CPU 340 illustrated in FIG. 3, or one or more modules in processing device 140 illustrated in FIG. 4). The schematic diagrams of the illustrated process presented below are intended to be illustrative.

As shown in FIG. 24, interface 900 may include first region 1210 and second region 1220. Box 1210a may indicate the primary indicator corresponding to the primary data. Arrow 1230 (also referred to as moving operation 1230) may indicate the moving operation that moves box 1210a from first region 1210 to second region 1220 of user interface 1200. In some embodiments, when the moving operation 1230 is performed by the user via a mouse, the box 1210a (or the cursor for moving the box 1210a) may follow or not follow the cursor. After the box 1210a (or the cursor for moving the box 1210a) is moved into the second region 1220, a loading command list 1250 may be displayed in the second region 1220. Loading command list 1250 may include sub-region 1220a, sub-region 1220b, sub-region 1220c, and sub-region 1220d. Merely by way of example, with reference to medical data of an object, sub-region 1220a may correspond to a secondary data loading command for loading a duplicate of the primary data (or a portion thereof) to be displayed in the form of text in second region 1220, and sub-region 1220b may correspond to a secondary data loading command for double checking the primary data (or a portion thereof) in second region 1220, and sub-region 1220c may correspond to a secondary data loading command for loading an image (e.g., a CT image, a MRI image, a PET image, etc.) of the primary data (or a portion thereof) in second region 1220, and sub-region 1220d may correspond to a secondary data loading command for loading an image (e.g., a CT image, a MRI image, a PET image, etc.) of the primary data (or a portion thereof) to be compared with another image (e.g., a CT image, a MRI image, a PET image, etc.) of other data in second region 1220.

By performing moving operation 1230 by a user (e.g., a doctor), box 1210a may be moved from an initial position in first region 1210 to an end position in second region 1220. When box 1210a is at the end position in second region 1220 and box 1210a (or the cursor for moving the box 1210a) overlaps or partially overlaps a sub-region of second region 1220, processing module 440 may determine the secondary data loading command based on the sub-region. As shown in FIG. 25, box 1210a (or the cursor for moving the box 1210a) is moved to sub-region 1220c of second region 1220, processing module 440 may determine that the secondary data loading command is to load an image (e.g., a CT image) of the primary data to be displayed in second region 1220. Processing module 440 may then generate the secondary data for display based on the primary data and the secondary data loading command.

It should be noted that the above descriptions of interface 1200 are provided for the purposes of illustration, and not intended to limit the scope of the present disclosure. For persons having ordinary skills in the art, various modifications and changes in the forms and details of the application of the above method and system may occur without departing from the principles of the present disclosure. In some embodiments, interface 1200 may include one or more other sub-regions corresponding to one or more other primary data loading commands. In some embodiments, interface 1200 may include one or more other primary indicators corresponding to other data. However, those variations and modifications also fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A non-transitory computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

I claim:

1. A system, comprising:
   at least one storage device including a set of instructions; and
   at least one processor configured to communicate with the at least one storage device, wherein when executing the set of instructions, the at least one processor is configured to cause the system to:
   obtain primary data related to an object;
   generate a primary indicator related to the primary data for display in a first region of a user interface;
   receive a primary user instruction related to a moving operation applied on the primary indicator that moves the primary data from the first region to a second region of the user interface, wherein
      a plurality of sub-regions, corresponding to different sections of the user interface and are separated by a border, are displayed in the second region of the user interface,
      each of the plurality of sub-regions indicates, by being associating with a corresponding data loading command, a mode in which the primary data is to be displayed in the second region on the user interface, and
      at least one of the modes includes displaying the primary data in the second region in a form of an image;
   determine an end position of the primary indicator based on the primary user instruction;
   identify a sub-region from the plurality of sub-regions, wherein the end position of the primary indicator is in an area of the identified sub-region;
   determine the corresponding data loading command associated with the identified sub-region as a primary data loading command, wherein the primary data loading command includes one or more secondary data loading commands;

in response to the moving operation, generate one or more secondary indicators for display on the user interface, each secondary indicator of the one or more secondary indicators corresponding to a secondary data loading command of the one or more secondary data loading commands;

receive a secondary user instruction related to a selection of a particular secondary indicator from the one or more secondary indicators;

select, based on the secondary user instruction, a secondary indicator; and generate, based on the primary data and the secondary data loading command corresponding to the selected secondary indicator, secondary data for display in the second region of the user interface.

2. The system of claim 1, wherein the moving operation moves the primary data from the first region to the second region of the user interface by moving the primary indicator from the first region to the second region.

3. The system of claim 1, wherein at least one of the primary user instruction or the secondary user instruction is received via a user input device configured to:
implement the user interface;
detect a user operation; and
generate the moving operation based on the detected user operation.

4. The system of claim 3, wherein the user operation includes at least one operation of a motion of at least a portion of the user on the user interface, a voice input, or a gesture of the user.

5. The system of claim 1, wherein the secondary data includes an image related to an anatomical structure of the object or an imaging protocol related to the object.

6. The system of claim 1, wherein the at least one processor is further configured to cause the system to:
in response to the moving operation, generate a loading command list in the second region, wherein the loading command list includes the one or more secondary indicators.

7. The system of claim 6, wherein the at least one processor is further configured to cause the system to:
cause the primary indicator to be displayed adjacent to the secondary indicator.

8. The system of claim 1, wherein the secondary data is at least a part of the primary data or generated from the primary data according to the primary data loading command.

9. The system of claim 1, wherein the modes further include displaying the primary data in the second region in a form text.

10. A method implemented on at least one machine each of which has at least one processor and a storage device, comprising:
obtaining primary data related to an object;
generating a primary indicator related to the primary data for display in a first region of a user interface;
receiving a primary user instruction related to a moving operation applied on the primary indicator that moves the primary data from the first region to a second region of the user interface, wherein
a plurality of sub-regions, corresponding to different sections of the user interface and are separated by a border, are displayed in the second region of the user interface, each of the plurality of sub-regions indicates, by being associating with a corresponding data loading command, a mode in which the primary data is to be displayed in the second region on the user interface, and at least one of the modes includes displaying the primary data in the second region in a form of an image;

determining an end position of the primary indicator based on the primary user instruction;

identifying a sub-region from the plurality of sub-regions, wherein the end position of the primary indicator is in an area of the identified sub-region;

determining the corresponding data loading command associated with the identified sub-region as a primary data loading command, wherein the primary data loading command includes one or more secondary data loading commands;

in response the moving operation, generating one or more secondary indicators for display on the user interface, each secondary indicator of the one or more secondary indicators corresponding to a secondary data loading command of the one or more secondary data loading commands;

receiving a secondary user instruction related to a selection of a particular secondary indicator from the one or more secondary indicators;

selecting, based on the secondary user instruction, a secondary indicator; and generating, based on the primary data and the secondary data loading command corresponding to the selected secondary indicator, secondary data for display in the second region of the user interface.

11. The method of claim 10, wherein the moving operation moves the primary data from the first region to the second region of the user interface by moving the primary indicator from the first region to the second region.

12. The method of claim 10, wherein at least one of the primary user instruction or the secondary user instruction is received via a user input device configured to:
implement the user interface;
detect a user operation; and
generate the moving operation based on the detected user operation.

13. The method of claim 12, wherein the user operation includes at least one operation of a motion of at least a portion of the user on the user interface, a voice input, or a gesture of the user.

14. The method of claim 10, wherein the primary data relates to an attribute of the object.

15. The method of claim 10, wherein the secondary data includes an image related to an anatomical structure of the object or an imaging protocol related to the object.

16. The method of claim 10, wherein the method further comprising:
in response to the moving operation, generating a loading command list in the second region, wherein the loading command list includes the one or more secondary indicators.

17. The method of claim 16, further comprising:
causing the primary indicator to be displayed adjacent to the secondary indicator.

18. A non-transitory computer readable medium embodying a computer program product, the computer program product comprising instructions configured to cause a computing system to:
obtain primary data related to an object;

generate a primary indicator related to the primary data for display in a first region of a user interface;

receive a primary user instruction related to a moving operation applied on the primary indicator that moves the primary data from the first region to a second region of the user interface, wherein
- a plurality of sub-regions, corresponding to different sections of the user interface and are separated by a border, are displayed in the second region of the user interface,
- each of the plurality of sub-regions indicates, by being associating with a corresponding data loading command, a mode in which the primary data is to be displayed in the second region on the user interface, and
- at least one of the modes includes displaying the primary data in the second region in a form of an image;

determine an end position of the primary indicator based on the primary user instruction;

identify a sub-region from the plurality of sub-regions, wherein the end position of the primary indicator is in an area of the identified sub-region;

determine the corresponding data loading command associated with the identified sub-region as a primary data loading command, wherein the primary data loading command includes one or more secondary data loading commands;

in response to the moving operation, generate one or more secondary indicators for display on the user interface, each secondary indicator of the one or more secondary indicators corresponding to a secondary data loading command of the one or more secondary data loading commands;

receive a secondary user instruction related to a selection of a particular secondary indicator from the one or more secondary indicators;

select, based on the secondary user instruction, a secondary indicator; and generate, based on the primary data and the secondary data loading command corresponding to the selected secondary indicator, secondary data for display in the second region of the user interface.

* * * * *